(12) United States Patent
Carlson

(10) Patent No.: US 11,531,549 B1
(45) Date of Patent: *Dec. 20, 2022

(54) SYSTEM AND METHOD FOR INSTRUCTION MAPPING IN AN OUT-OF-ORDER PROCESSOR

(71) Applicant: Marvell Asia Pte, Ltd., Singapore (SG)

(72) Inventor: David A. Carlson, Haslet, TX (US)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 17/218,771

(22) Filed: Mar. 31, 2021

Related U.S. Application Data

(63) Continuation of application No. 16/447,431, filed on Jun. 20, 2019, now Pat. No. 10,996,957.

(51) Int. Cl.
*G06F 9/38* (2018.01)
*G06F 9/30* (2018.01)

(52) U.S. Cl.
CPC .......... *G06F 9/384* (2013.01); *G06F 9/3005* (2013.01); *G06F 9/30098* (2013.01)

(58) Field of Classification Search
CPC ..................................................... G06F 9/384
See application file for complete search history.

(56) References Cited

U.S. PATENT DOCUMENTS

| | | | |
|---|---|---|---|
| 5,497,499 A | 3/1996 | Garg et al. | |
| 5,961,636 A | 10/1999 | Brooks et al. | |
| 7,406,587 B1 | 7/2008 | Zhang et al. | |
| 7,979,678 B2 | 7/2011 | Deosaran et al. | |
| 10,996,957 B1 | 5/2021 | Carlson | |
| 11,036,515 B1 | 6/2021 | Carlson | |
| 2002/0062435 A1* | 5/2002 | Nemirovsky | G06F 9/3851 712/7 |
| 2007/0043934 A1 | 2/2007 | Sodani et al. | |

(Continued)

OTHER PUBLICATIONS

Garcia Ordaz, José et al., "A Reorder Buffer Design for High Performance Processors," Computación y Sistemas, vol. 16, No. 1, pp. 15-25 (2012) (English Abstract Included).

(Continued)

*Primary Examiner* — Michael J Metzger
(74) *Attorney, Agent, or Firm* — Hamilton, Brook, Smith & Reynolds, P.C.

(57) ABSTRACT

A system and corresponding method map instructions in an out-of-order (OoO) processor. The system comprises a mapper, integer snapshot circuitry, and floating-point (FP) snapshot circuitry. The mapper maps instructions by mapping integer and FP architectural registers (ARs) of the instructions to integer and FP physical registers of the OoO processor, respectively. The mapper records, via at least one present FP indicator, presence of FP ARs used as destinations in the instructions. The mapper copies, periodically, the integer mapper state to the integer snapshot circuitry and copies, intermittently, based on the at least one FP present indicator, the FP mapper state to the FP snapshot circuitry. Copies of the integer and FP mapper state in the integer and FP snapshot circuitry, respectively, improve performance for instruction unwinding caused, for example, by an exception, branch/jump mispredict, etc. By copying the FP mapper state, intermittently, power efficiency of the OoO processor is improved.

39 Claims, 11 Drawing Sheets

(56) References Cited

U.S. PATENT DOCUMENTS

| | | |
|---|---|---|
| 2008/0263332 A1* | 10/2008 | Yehia ................. G06F 9/30181 |
| | | 712/E9.035 |
| 2014/0122837 A1 | 5/2014 | Zhu et al. |
| 2016/0011876 A1 | 1/2016 | Mukherjee et al. |
| 2016/0011877 A1 | 1/2016 | Mukherjee et al. |
| 2020/0089559 A1 | 3/2020 | Ainsworth et al. |
| 2021/0255870 A1 | 8/2021 | Carlson |

OTHER PUBLICATIONS

Moudgill, Mayan and Keshav Pingali, "Register Renaming and Dynamic Speculation: an Alternative Approach," Proceedings of the 26th Annual International Symposium on Microarchitecture, Austin, Texas, pp. 202-213 (Dec. 1-3, 1993).

Rosière, Mathieu et al., "An Out-of-Order Superscalar Processor on FPGA: The ReOrder Buffer Design," 2012 Design, Automation & Test in Europe Conference & Exhibition, Dresden, Germany, 6 pages (2012).

Wikipedia: Register renaming, retrieved from internet at: https://en.wikipedia.org/wiki/Register_renaming, retrieved from internet on: Feb. 11, 2019, 8 pages.

U.S. Appl. No. 16/447,470, entitled "System and Method for Instruction Unwinding in an Out-of-Order Processor," filed Jun. 20, 2019.

Notice of Allowance dated Mar. 24, 2021 in U.S. Appl. No. 16/447,470, entitled "System and Method for Instruction Unwinding in an Out-of-Order Processor," filed Jun. 20, 2019 (71 pages).

* cited by examiner

SYSTEM AND METHOD FOR INSTRUCTION MAPPING IN AN OUT-OF-ORDER PROCESSOR

RELATED APPLICATIONS

This application is a continuation of U.S. application Ser. No. 16/447,431, filed on Jun. 20, 2019. The entire teachings of the above application are incorporated herein by reference.

BACKGROUND

Out-of-order (OoO) execution is employed by most high-performance processors to make use of instruction cycles that would otherwise be wasted. A processor that executes instructions OoO is referred to as an OoO processor and executes instructions OoO relative to an original order of the instructions in a program, that is, a program order of the instructions that is generated by a compiler.

By executing instructions OoO, the OoO processor can avoid being idle while waiting for a preceding instruction to complete and can, in the meantime, process one or more next instructions that are able to run immediately and independently. An OoO processor relies on register renaming which is an operation that renames architectural (i.e., logical) registers in an instruction with physical registers of the OoO processor. Such a renaming operation may be referred to interchangeably herein as instruction mapping.

Register renaming eliminates false data dependencies that arise from reuse of architectural registers by successive instructions that do not have any real data dependencies between them. The elimination of these false data dependencies reveals more instruction-level parallelism in an instruction stream, which can be exploited by OoO execution for better performance.

SUMMARY

According to an example embodiment, a system for instruction mapping in an out-of-order (OoO) processor comprises a mapper configured to map instructions by mapping integer and floating-point (FP) architectural registers (ARs) of the instructions to integer and FP physical registers (PRs) of the OoO processor, respectively, based on integer mapper state and FP mapper state of the mapper, respectively. The mapper is further configured to record, via at least one FP present indicator, a presence or an absence of FP ARs used as destinations in the instructions. The system further comprises integer and FP snapshot circuitry. The mapper is further configured to copy, periodically, the integer mapper state to the integer snapshot circuitry and to copy, intermittently, based on the at least one FP present indicator, the FP mapper state to the FP snapshot circuitry.

The system further comprises a journal partitioned into a plurality of sections with respective boundaries therebetween. The mapper is further configured to write a respective entry to the journal for each instruction, copy the integer mapper state to the integer snapshot circuitry, periodically, responsive to a change in sections of the journal written to by the mapper, and copy the FP mapper state to the FP snapshot circuitry, intermittently, based on the at least one FP present indicator and the change in sections.

The journal may be a circular buffer with a head pointer and a tail pointer. The mapper may be further configured to detect the change in sections based on a modification made to the head pointer.

The system further comprises an integer-register mapper table and an integer physical register (PR) free list. The integer mapper state represents the integer-register mapper table in its present state and the integer-PR free list in its present state. To copy the integer mapper state to the integer snapshot circuitry, the mapper may be further configured to copy, in response to the change, (i) the integer-register mapper table to a given integer-register-map snapshot of a plurality of integer-register-map snapshots included in the integer snapshot circuitry and (ii) the integer-PR free list to a given integer-PR-free-list snapshot of a plurality of integer-PR-free-list snapshots included in the integer snapshot circuitry. The given integer-register-map snapshot and the given integer-PR-free-list snapshot may be associated with a given boundary of the respective boundaries. The given boundary may be crossed based on the change.

The given integer-register-map snapshot may include a first respective arrangement of circuitry configured to store a respective copy of the integer-register mapper table. The given integer-PR-free-list snapshot may include a second respective arrangement of circuitry configured to store a respective copy of the integer-PR free list.

The system may further comprise an FP-register mapper table and an FP physical register (PR) free list. The FP mapper state may represent the FP-register mapper table in its present state and the FP-PR free list in its present state. In an event copying of the FP mapper state to the FP snapshot circuit is enabled based on the at least one FP present indicator, the mapper may be further configured to copy, in response to the change, (i) the FP-register mapper table to a given FP-register-map snapshot of a plurality of FP-register-map snapshots included in the FP snapshot circuitry and (ii) the FP-PR free list to a given FP-PR-free-list snapshot of a plurality of FP-PR-free-list snapshots included in the FP snapshot circuitry. The given FP-register-map snapshot and the given FP-PR-free-list snapshot may be associated with a given boundary of the respective boundaries. The given boundary may be crossed based on the change.

The given FP-register-map snapshot may include a first respective arrangement of circuitry configured to store a respective copy of the FP-register mapper table. The given FP-PR-free-list snapshot may include a second respective arrangement of circuitry configured to store a respective copy of the FP-PR free list.

The at least one FP present indicator may include a plurality of FP present indicators. Each FP present indicator of the plurality of FP present indicators may be associated, on a one-to-one basis, with a respective section of the plurality of sections of the journal.

Each FP present indicator of the plurality of FP present indicators may be initialized to be set.

The change may be from a first section of the journal to a second section of the journal. The mapper may be further configured to read each FP present indicator of the plurality of FP present indicators in response to the change. In an event each FP present indicator of the plurality of FP present indicators is clear, the mapper may be further configured to disable copying of the FP mapper state to the FP snapshot circuitry. In an event at least a single FP present indicator of the plurality of FP present indicators is set, the mapper may be further configured to copy, in response to the change, the FP mapper state to the FP snapshot circuitry and to clear a given FP present indicator of the plurality of FP present indicators. The given FP present indicator may be associated with the second section.

The at least one FP present indicator may be a counter. In an event the counter is zero, the mapper may be further configured to disable copying of the FP mapper state to the FP snapshot circuitry. In an event the counter is non-zero, copy, the mapper may be configured, in response to the change, to copy the FP mapper state to the FP snapshot circuitry.

The integer-register mapper table may be a lookup table (LUT) including a plurality of entries. Each entry of the plurality of entries of the LUT may be indexed via a unique integer architectural register (AR) of a plurality of integer ARs of the OoO processor and may be configured to reference a unique integer PR of the integer PRs of the OoO processor. The integer ARs of the instructions may be from among the plurality of integer ARs of the OoO processor.

The FP-register mapper table may be a LUT including a plurality of entries. Each entry of the plurality of entries of the LUT may be indexed via a unique FP AR of a plurality of FP ARs of the OoO processor and may be configured to reference a unique FP PR of the FP PRs of the OoO processor. The FP ARs of the instructions may be from among the plurality of FP ARs of the OoO processor.

The integer-PR free list may be configured to identify free integer PRs. The FP-PR free list may be configured to identify free FP PRs. The free integer PRs are unmapped integer PRs and the free FP PRs are unmapped FP PRs.

To map the instructions, the mapper may be further configured, for each instruction, to determine whether the instruction includes at least one instance of an integer AR used as a source. In an event the instruction includes the at least one instance, the mapper may be further configured to use the integer mapper register table to map a respective integer AR of each instance of the at least one instance to a respective integer PR of the OoO processor.

To map the instructions, the mapper may be further configured, for each instruction, to determine whether the instruction includes at least one instance of an FP AR used as a source. In an event the instruction includes the at least one instance, the mapper may be further configured to use the FP mapper register table to map a respective FP AR of each instance of the at least one instance to a respective FP PR of the OoO processor.

The system may further comprise a journal. To map the instructions, the mapper may be further configured, for each instruction, to write an entry to the journal for the instruction. Content of the entry may represent an effect or lack thereof on the integer or FP mapper state that resulted from mapping of the instruction.

The mapper may be further configured to map a given number of instructions on a cycle-by-cycle basis and to write at least one entry, of the given number, to the journal on the cycle-by-cycle basis.

In an event an actual number of instructions received in a cycle is less than the given number, the mapper may be further configured to write the at least one entry, of the given number, to the journal and, in at least one respective entry of the at least one entry written, indicate via the content that the effect is no effect. A total number of the at least one respective entry is a difference between the given number and the actual number.

In an event the instruction has no instance of either an integer or FP AR used as a destination, the effect is no effect, and the mapper may be further configured to indicate, via the content of the entry, that no change to either the integer or FP mapper state resulted from mapping the instruction.

In an event the instruction includes at least one instance of an integer AR used as a destination, the effect includes at least one change to the integer mapper state. The mapper may be further configured to include in the content, for each instance of the at least one instance, the integer AR, a present integer PR, and a next integer PR. The integer-register mapper table, in its present state, includes a mapping between the integer AR and the present integer PR. Prior to mapping of the instruction, the next integer PR is a free integer PR. The mapper may be further configured to remove the free integer PR from the integer-PR free list and to change the mapping to be between the integer AR and the next integer PR, causing the mapper to map the integer AR of the instruction to the next integer PR.

In an event the mapper is notified of completion of the instruction by the OoO processor, the mapper may be further configured to retire the entry from the journal and add, based on the content, the present integer PR of each instance of the at least one instance to the integer-PR free list.

In an event the instruction includes at least one instance of an FP AR used as a destination, the effect includes at least one change to the FP mapper state. The mapper is further configured to update the at least one FP indicator and to include in the content, for each at least one instance, the FP AR, a present FP PR, and a next FP PR. The FP-register mapper table, in its present state, includes a mapping between the FP AR and the present FP PR. Prior to mapping of the instruction, the next FP PR is a free FP PR. The mapper is further configured to remove the free FP PR from the FP-PR free list and change the mapping to be between the FP AR and the next FP PR, causing the mapper to map the FP AR of the instruction to the next FP PR.

In an event the mapper is notified of completion of the instruction by the OoO processor, the mapper may be further configured to retire the entry from the journal and add, based on the content, the present FP PR of each instance of the at least one instance to the FP-PR free list.

The journal may be partitioned into a plurality of sections. The entry is located within a given section of the plurality of sections. The at least one FP present indicator may include a plurality of FP present indicators, each FP present indicator of the plurality of FP present indicators associated with a respective section of the plurality of sections on a one-to-one basis. In an event the instruction includes at least one instance of an FP AR used as a destination, the mapper may be further configured to set a given FP present indicator of the plurality of FP present indicators. The given FP present indicator is associated with the given section.

The at least one FP present indicator may be a counter. The journal may be a circular buffer configured to store at most a maximum number of entries. The mapper may be further configured to set the counter to twice the maximum number of entries in an event the instruction includes at least one instance of an FP AR used as a destination. The mapper may be further configured to set the counter to twice the maximum number of entries in an event the counter is non-zero and a request for instruction unwinding (also referred to interchangeably herein as undoing, reversing, or unrolling) is received. The mapper may be further configured to decrement the counter in an event the instruction does not include the at least one instance. It should be noted that such decrementing of the counter saturates at zero and, thus, the counter does not go negative. The mapper may be further configured to disable copying of the FP mapper state to the FP snapshot circuitry, in an event the counter is zero. The mapper may be further configured to enable copying of the FP mapper state to the FP snapshot circuitry, in an event the counter is non-zero.

According to another example embodiment, a method for instruction mapping in an out-of-order (OoO) processor comprises mapping instructions by mapping integer and floating-point (FP) architectural registers (ARs) of the instructions to integer and FP physical registers (PRs) of the OoO processor, respectively, based on integer mapper state and FP mapper state, respectively. The method further comprises recording, via at least one FP present indicator, presence of FP ARs used as destinations in the instructions. The method further comprises copying, periodically, the integer mapper state to integer snapshot circuitry and copying, intermittently, based on the at least one FP present indicator, the FP mapper state to FP snapshot circuitry.

Alternative method embodiments parallel those described above in connection with the example system embodiment.

It should be understood that example embodiments disclosed herein can be implemented in the form of a method, apparatus, system, or computer readable medium with program codes embodied thereon.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

Figure 1A:
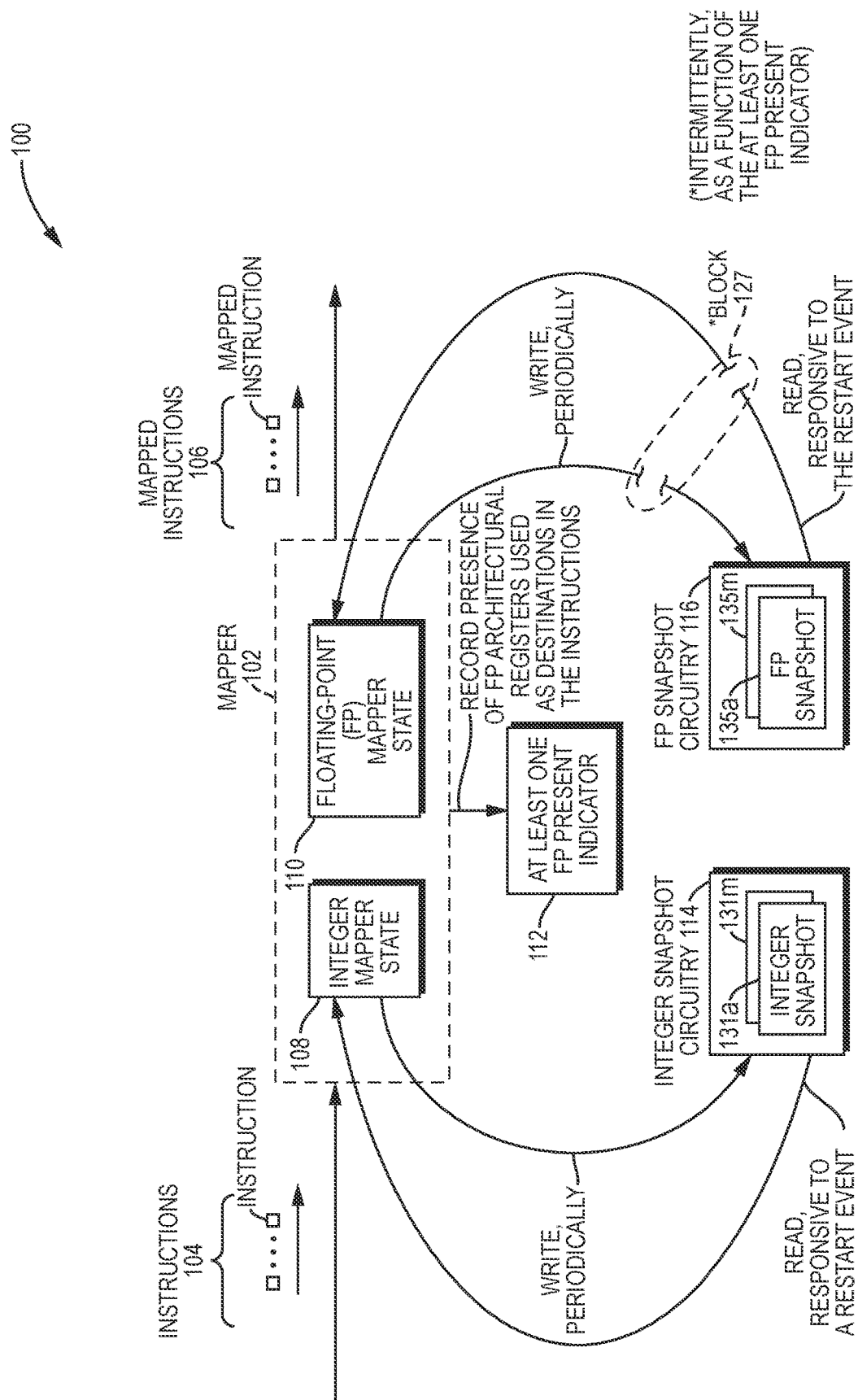
FIG. 1A is a block diagram of an example embodiment of a system for mapping and unwinding instructions in an out-of-order (OoO) processor.

A description of example embodiments follows.

An out-of-order (OoO) processor employs a mapping function. In the mapping function, all of the source and destination registers for an instruction are "mapped" from architectural registers (ARs) to physical registers (PRs) by a mapper, such as the mapper 102 of FIGS. 1B-C, disclosed further below. Mapping an architectural register (AR) used as a destination in the instruction causes a state of the mapper to change. Using an AR as a destination results in a write to that AR. To map an AR used as a destination, the mapper finds a "free" physical register (PR) that is not presently mapped to any AR. The mapper changes the state of the mapper by changing a mapping between the AR and a given PR to a mapping between the AR and the free register.

As such, multiple instructions that use a same AR as a destination do not interfere with one another as the multiple instructions use different PRs as the destinations based on the change in AR-to-PR mapping. According to an example embodiment, a journal (also referred to interchangeably herein as a reorder buffer), such as the journal 130 of FIG. 1E, or the journal 130 of FIG. 1F, disclosed further below, may be used to store a history of what actions are taken by the mapper to map the instruction. Such history includes AR-to-PR mapping changes caused by mapping ARs used as destination registers in the instructions.

For example, if an instruction uses AR A as a destination, a given journal entry associated with that instruction may be used to store a state change, such as AR A was equal to PR 1 but is now equal to PR 0, while another journal entry associated with a different instruction may indicate that no state change resulted from mapping the different instruction. For example, no state change occurs if an instruction does not use an AR as a destination. Such a history allows the OoO processor to be backed up to a former state in an event an exception occurs.

In the event the exception occurs in the OoO processor, such as a branch/jump mispredict or order mispredict, among others, the journal (i.e., reorder buffer) may be read backwards, that is, in an order that is reverse relative to an order used for writing the journal. The journal is read backwards such that all of the state changes caused by mapping instructions subsequent to the exception (referred to interchangeably herein as "bad path" instructions) get unwound (e.g., undone or unrolled) as state changes caused by mapping those instructions are back-out, in an order that is reverse from an order in which they were applied.

For example, in an event a memory system (not shown) of the OoO processor determines that it cannot service a given instruction and, thus, takes an exception, the OoO processor unwinds subsequent instructions that followed the given instruction. Even though the subsequent instructions followed the given instruction in a program order generated by a compiler, the OoO processor started working on those subsequent instructions before the given instruction because the OoO processor is capable of executing instructions out-of-order. Since a consequence of register renaming, that is, mapping ARs to PRs, is that a present state of AR-to-PR mappings is changed, dynamically, unwinding of those subsequent instructions includes reversing the state changes that were made due to the mapping in an order that is reverse from an order used to apply those state changes. The mapper may read and undo the state changes stored in the journal in reverse order in order to undo such changes and restore the state.

To improve performance for such unwinding operations, the mapper periodically creates "snapshots," that is, the mapper stores copies of a present state of the mapper, such as the present state of the integer mapper sate 108 and the floating-point (FP) mapper state 110, disclosed further below with reference to FIG. 1B. When the exception occurs, the mapper skips to the nearest snapshot and then starts unwinding from there, as disclosed further below with reference to FIG. 1G. Such snapshots may employ a significant amount of logic and hence power when being accessed/written to. To reduce such power, an example embodiment partitions mapper logic and state into integer and FP logic and state.

A source or destination register for an instruction either uses either the integer or FP logic, but not both. According to an example embodiment, separate snapshots are maintained for integer and FP state, such as disclosed further below with regard to FIG. 1B. During normal operation, both portions of the mapper are in use. Every snapshot that occurs updates both pieces, that is, both the integer state and FP state are stored each time a snapshot is taken. While mapping instructions, it's noted (i.e., recorded) if an instruction that employs an FP AR as a destination has been seen. If no instruction has been seen, over a stretch of received instructions, that employs an FP AR as a destination, an example embodiment may determine that an FP snapshot, if performed, would be identical to a last FP snapshot that was performed.

An example embodiment may determine that a long enough period has transpired, for example, based on a given number of instructions that have been mapped, during which no instruction has used an FP AR as a destination and, as such, it may be determined that all FP snapshots being maintained are identical. At this point, an example embodiment may stop writing to the FP snapshot upon mapping and may further ignore reading such snapshots during an unwinding operation. At some point an instruction using an FP AR as a destination may be encountered. Such an encounter may alter at least one FP present indicator, such as the at least one FP present indicator 112 of FIG. 1A, disclosed below, causing FP snapshots to be updated once again while mapping instructions, such as disclosed further below with regard to FIG. 1B, and to be used again during unwinding of instructions, such as disclosed further below with regard to FIG. 1G.

In a typical program executed by the OoO processor, there may be large stretches of code, that is, a large number of instructions, that do not employ FP instructions. As such, FP ARs used as destinations may be absent over large stretches of instructions. An example embodiment may record presence of FP ARs used as destinations in order to identify such large stretches in which FP ARs are not present and use such information to improve power efficiency of the OoO processor. Such information may be used during both mapping and unwinding operations to reduce access/writing to FP snapshot circuitry, such as the FP snapshot circuitry 116, disclosed below with regard to FIG. 1A, in order to improve power efficiency.

FIG. 1A is a block diagram of an example embodiment of a system 100 for mapping and unwinding instructions 104 in an out-of-order (OoO) processor (not shown). According to an example embodiment, the OoO processor may be a processor core of plurality of processor cores, such as a processor core of the plurality of processor cores 620a-k of the network services processor 650 of FIG. 6, disclosed further below.

The system 100 comprises a mapper 102. The mapper 102 is configured to use integer mapper state 108 (also referred to interchangeably herein as present integer mapper state 108) and floating-point (FP) mapper state 110 (also referred to interchangeably herein as present FP mapper state 110) for mapping the instructions 104 to produce the mapped instructions 106. The mapper 102 maps the instructions 104 by mapping integer and FP architectural registers (ARs) (not shown) of the instructions 104 to integer and FP physical registers (PRs) (not shown) of the OoO processor. The mapper 102 is configured to record, via the at least one FP present indicator 112, presence of FP architectural registers (ARs) (not shown) used as destinations (not shown) in the instructions 104.

Mapping an architectural register (AR) that is used as a destination register in an instruction changes mapper state, in general. For example, mapping an integer AR that is used as a destination in the instruction causes the integer mapper state 108 to change, as disclosed further below. Similarly, mapping an FP AR that is used as a destination in the instruction causes the FP mapper state 110 to change, as disclosed further below. As such, the integer mapper state 108 and FP mapper state 110 change, dynamically, as the mapper 102 is parsing the instructions 104. According to an example embodiment, each of the instructions 104 is associated with a respective mapper identifier (ID) that is unique. The respective mapper ID is also associated with a given entry of a journal, such as the journal 130 of FIG. 1E or the journal 130 of FIG. 1F, disclosed further below. The given entry indicates whether a change was made to the integer mapper state 108 or FP mapper sate 110 as a result of mapping a respective instruction. The respective mapper ID identifies a given location in the journal that is associated with the respective instruction, that is, the respective mapper ID identifies the given entry that can be used to unwind (i.e., undo or unroll) any state change(s) included in the given entry should an exception be triggered causing same.

The system 100 comprises integer snapshot circuitry 114 and FP snapshot circuitry 116 configured to store integer snapshots the 131a-m and FP snapshots 135a-m of the integer mapper state 108 and FP mapper state 110, respectively. Such snapshots represent the integer mapper state 108 and FP mapper state 110 captured at points in time. The mapper 102 is configured to use the snapshots to expedite restoration of the integer mapper state 108 and FP mapper state 110 to former respective states, as disclosed further below with regard to FIG. 1G, in an event a restart event (not shown) transpires.

By advantageously selecting a given integer snapshot from among the stored integer snapshots 131a-m, the mapper 102 can skip to a particular earlier state of the integer mapper state 108 that was present earlier and needs a least number of integer state changes to be restored to a particular former integer mapper state (not shown). The mapper 102 uses the given integer snapshot to expedite the restoration relative to restoring the integer mapper state 108 back to the former integer mapper state, directly. For example, instead of applying integer state changes to the integer mapper state 108, directly, the mapper 102 may copy the given integer snapshot to the integer mapper state 108 to skip to the earlier state and then apply a number of integer state changes that are less relative to another number of integer state changes that would need to be applied to the integer mapper state 108, directly, in order to restore the integer mapper state 108 to the former integer mapper state.

The least number of state changes are least in number relative to a total number of state changes that would need to be applied to any of the other stored integer snapshots in order to restore the integer mapper state 108 back to the former integer mapper state. The former integer mapper state represents the integer mapper state 108 at a point in time before a sequence of integer mapper state changes (not shown) were applied thereto. The sequence of integer mapper state changes was applied as a result of mapping instructions subsequent to the instruction causing the restart event.

Reversing the sequence of integer mapper state changes "unwinds" the instructions that were mapped, resulting in same. Reversing the sequence unrolls the state changes caused by mapping the instructions, that is, the bad-path instructions that were executed before the instruction earlier in the program order was executed and caused the restart event. Unwinding an instruction reverses any effect on the system 100 that was caused by mapping and executing the instruction. Instructions that are eligible for unwinding are those instructions that are "in-flight" instructions, that is, instructions that have been mapped by the OoO processor but not yet retired by the OoO processor.

The mapper 102 uses the integer mapper state 108 for mapping integer ARs in the instructions 104 and uses the FP mapper state 110 for mapping FP ARs in the instructions 104. As such, similar to selecting and using a given integer snapshot of the integer mapper state 108 to expedite unwinding, the mapper 102 advantageously selects a given FP snapshot from among the stored FP snapshots 135a-m to expedite restoration of the FP mapper state 110 to a former FP mapper state (not shown) in an event the restart event transpires. The given FP snapshot that is selected may enable the mapper 102 to skip to a particular FP state of the FP mapper state 110 that needs a least number of FP state changes to be restored to the former FP mapper state.

To capture the integer snapshots 131a-m in the integer snapshot circuitry 114 and the FP snapshots 135a-m in the FP snapshot circuitry 116, the mapper 102 may be further configured to write to the integer snapshot circuitry 114 and FP snapshot circuitry 116, periodically. In order to restore the integer mapper state 108 and FP mapper state 110 to a former integer mapper state and former FP mapper state, respectively, the mapper 102 may be further configured to read from the integer snapshot circuitry 114 and FP snapshot circuitry 116 responsive to a restart event. The restart event causes at least one instruction to be unwound (e.g., undone), that is, any effect on the system 100 that was caused as a result of mapping and, possibly, executing the at least one instruction is reversed.

As disclosed above, in a typical program executed by the OoO processor, there may be large stretches of code that do not employ FP instructions. As such, FP ARs used as destinations may be absent over large stretches of instructions. By using the at least one FP present indicator 112 to record presence of the FP ARs used as destinations, the mapper 102 can advantageously track when changes to the FP mapper state 110 occur. The mapper 102 may use the at least one FP present indicator 112 to determine whether the FP snapshots 135a-m in the FP snapshot circuitry 116 are identical to the FP mapper state 110. To improve power efficiency of the OoO processor, as disclosed further below, the mapper 102 may avoid reading and writing to the FP snapshot circuitry 116 based on such knowledge.

For example, the mapper 102 may be blocked, intermittently, as a function of the at least one FP present indicator 112, from writing to and reading from the FP snapshot circuitry 116. Such blocking may be performed in any suitable way that prevents the FP snapshot circuitry 116 from being read from or written to. For example, the block 127 may be performed via block logic (not shown) that disables a particular clock(s) used for reading and writing the FP snapshot circuitry 116. Alternatively, the mapper 102 may be configured to read a value(s) of the at least one FP present indicator 112 and refrain from reading and writing the FP snapshot circuitry 116 based on the value(s) read.

To write to the integer snapshot circuitry 114 and the FP snapshot circuitry 116, the mapper 102 may be further configured to copy the integer mapper state 108 to a given integer snapshot of the integer snapshots 131a-m and to copy the FP mapper state 110 to a given FP snapshot of the FP snapshots 135a-m. To read from the integer snapshot circuitry 114 and FP snapshot circuitry 116, the mapper 102 may be further configured to copy a given integer snapshot of the integer snapshots 131a-m to the integer mapper state 108 and to copy a given FP snapshot of the FP snapshots 135a-m to the FP mapper state 110.

It should be understood that such a write/copy operation may be performed in any suitable manner that enables a present state of the integer mapper state 108 to be stored in the integer snapshot circuitry 114 and enables a present state of the FP mapper state 110 to be stored in the FP snapshot circuitry 116. For example, copy logic may be triggered that latches the integer mapper state 108 in a given arrangement of circuitry, that is, a given integer snapshot of the integer snapshots 131a-m of the integer snapshot circuitry 114, and latches the FP mapper state 110 in another given arrangement of circuitry, that is, a given FP snapshot of the FP snapshots 135a-m of the FP snapshot circuitry 116.

Similarly, it should be understood that such a read/copy operation may be performed in any suitable manner that causes a given integer snapshot of the integer snapshots 131a-m of the integer snapshot circuitry 114 to be transferred to the integer mapper state 108 and causes a given FP snapshot of the FP snapshots 135a-m of the FP snapshot circuitry 116 to be transferred to the FP mapper state 110. The read/copy operation may be employed for unwinding instructions, such as disclosed further below with regard to FIG. 1G, and the write/copy operation may be employed for mapping instructions, such as disclosed further below with regard to FIG. 1B.

By using the at least one FP present indicator 112 to refrain from copying the FP snapshot circuitry 116 to a given FP snapshot of FP snapshots 135a-m, and vice versa, at times when such copying is unnecessary because the FP mapper state 110 and each of the FP snapshots 135a-m are identical, power savings is achieved. Such savings may be considered substantial and is per-processor. According to an example embodiment, the OoO processor may be a processor core of plurality of processor cores, such as a processor core of the plurality of processor cores 620a-k of the network services processor 650 of FIG. 6, disclosed further below. As such, power savings is achieved for each processor core of the plurality of processor cores 620a-k. According to an example embodiment, a total number of the plurality of processor cores 620a-k may be 24; however, the total number is not limited to 24. As disclosed with regard to FIG. 1B, below, copying to the FP snapshot circuitry 116 to expedite unwinding may be advantageously blocked, as a function of the at least one FP present indicator 112, during mapping of instructions to realize a portion of such savings in power.

Figure 1B:
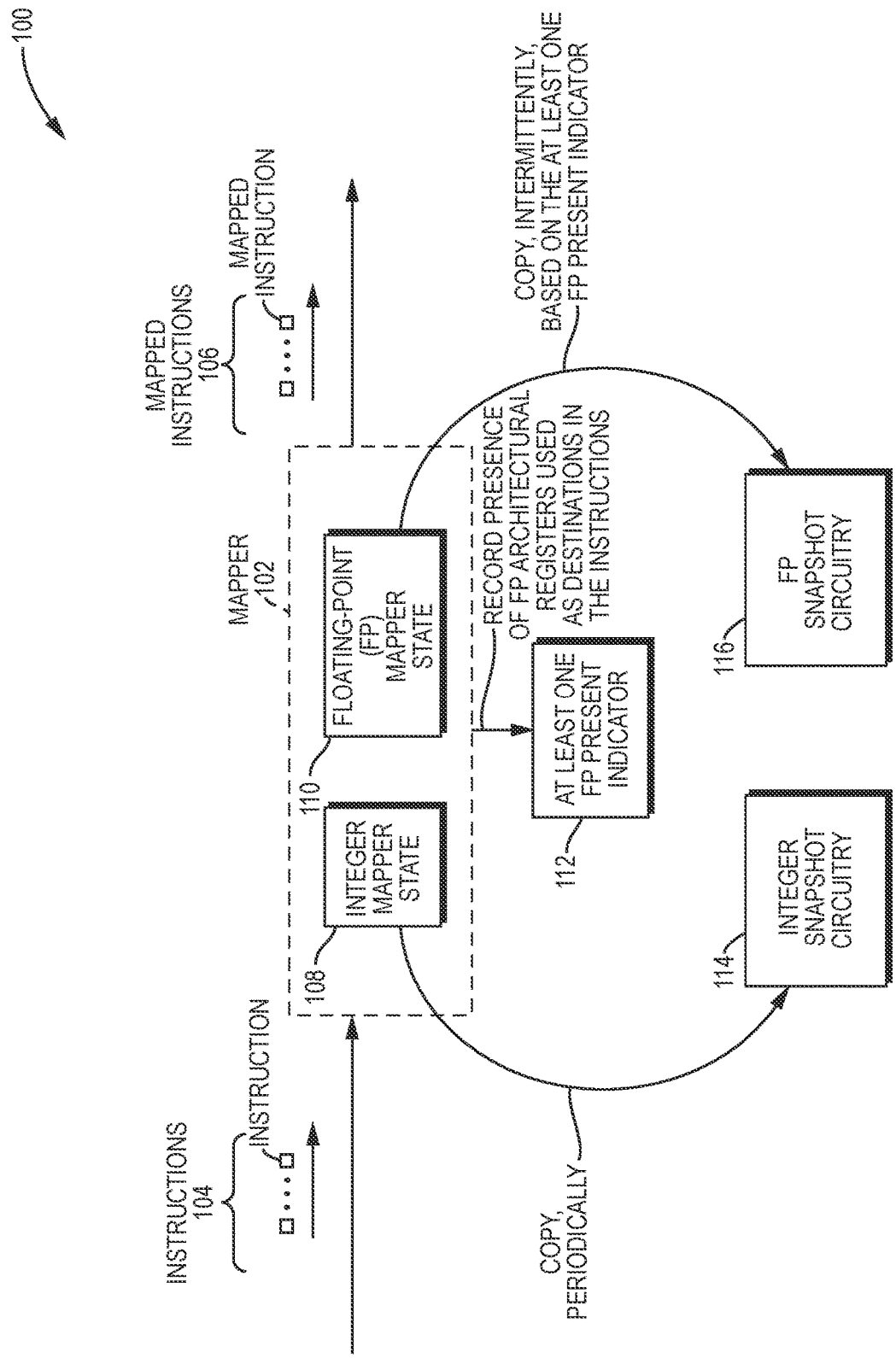
FIG. 1B is a block diagram of an example embodiment of the system of FIG. 1A that may be used for mapping instructions in the OoO processor.

FIG. 1B is a block diagram of an example embodiment of the system 100 of FIG. 1A. In the example embodiment, the system 100 is used for instruction mapping in the OoO processor. The system 100 receives the instructions 104 that may be instructions generated, originally, by a compiler (not shown), fetched from an instruction cache (not shown) and subsequently decoded by a decoder (not shown) for transmission to the mapper 102. The mapper 102 is configured to map the instructions 104 to produce the mapped instructions 106 for execution by an execution unit (not shown) of the OoO processor. The mapped instructions 106 may be considered to be in-flight instructions until such instructions have been both executed and completed by the OoO processor, at which point the mapped instructions 106 and, thus, the instructions 104, may be retired. It should be understood that it is possible for an instruction to be executed and retired without completion, for example, due to a branch mispredict or other exception event.

The mapper 102 is configured to map the instructions 104 by mapping integer architectural registers (ARs) (not shown) and floating-point (FP) ARs (not shown) of the instructions 104 to integer physical registers (PRs) (not shown) and FP PRs (not shown) of the OoO processor, respectively, based on integer mapper state 108 and FP mapper state 110 of the mapper 102, respectively. The mapper 102 is further configured to record, via the at least one FP present indicator 112, presence of FP ARs used as destinations in the instructions 104. The system 100 further comprises the integer snapshot circuitry 114 and FP snapshot circuitry 116.

The mapper 102 is further configured to copy, periodically, the integer mapper state 108 to the integer snapshot circuitry 114 and to copy, intermittently, based on the at least one FP present indicator 112, the FP mapper state 110 to the FP snapshot circuitry 116. Copying to the at least FP snapshot circuitry 116 is intermittent as such copying may be blocked, intermittently, as disclosed above, based on the at least one FP present indicator 112. Such blocking may be performed in an event the mapper 102 recognizes, via the at least one FP present indicator 112, that FP snapshots, such as the FP snapshots 135a-m of FIG. 1A, disclosed above, that are snapshots of the FP mapper state 110 stored in the FP snapshot circuitry 116, are identical to the FP mapper state 110.

The integer snapshot circuitry 114 may include an arrangement of flip-flops or any other combination of circuitry that may be employed to store/restore state of the integer mapper state 108 in a single cycle. Likewise, the FP snapshot circuitry 116 may include an arrangement of flip-flops or any other combination of circuitry that may be employed to store/restore state of the FP mapper state 110 in a single cycle.

The system 100 further comprises an integer-register mapper table (not shown) and an integer physical register (PR) free list (not shown), such as disclosed below with reference to FIG. 1C. The integer mapper state 108 represents the integer-register mapper table in its present state and the integer-PR free list in its present state. Presence of an integer AR used as a destination register in an instruction causes a change to the integer-register mapper table and the integer-PR free list, as disclosed further below. As such, presence of an integer AR used as a destination register in an instruction causes a change to the integer mapper state 108, as disclosed below.

Figure 1C:
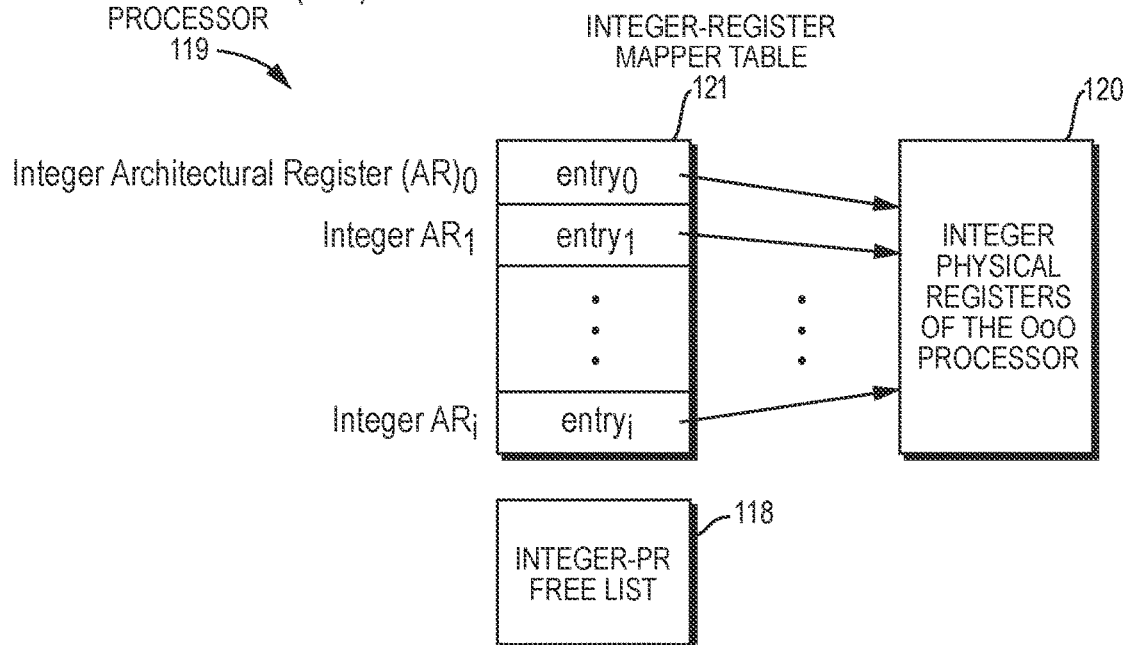
FIG. 1C is a block diagram of an example embodiment of an integer-register mapper table and an integer physical register (PR) free list.

FIG. 1C is a block diagram of an example embodiment of an integer-register mapper table 121 and an integer-PR free list 118 that may be employed in the system 100. The integer mapper state 108 disclosed above with reference to FIG. 1B, may represent the integer-register mapper table 121 in its present state and the integer-PR free list 118 in its present state.

With reference to FIG. 1B and FIG. 1C, to map the instructions 104, the mapper 102 may be further configured, for each instruction, to determine whether the instruction includes at least one instance of an integer AR used as a source. In an event the instruction includes the at least one instance, the mapper 102 may be further configured to use the integer mapper register table 116 to map a respective integer AR of each instance of the at least one instance to a respective integer PR of the integer PRs 120 of the OoO processor. As such, no change is made to either the integer-register mapper table 121 or the integer-PR free list 118 and, thus, no change is made to the integer mapper state 108 for mapping integer ARs used as sources in the instructions 104.

According to the example embodiment of FIG. 1C, the integer-register mapper table 121 is a lookup table (LUT) that includes a plurality of entries, namely, entry$_0$-entry$_i$. Each entry of the plurality of entries entry$_0$-entry$_i$ of the LUT, that is, the integer-register mapper table 121, is indexed via a unique integer architectural register (AR) of a plurality of integer ARs 119 of the OoO processor, namely integer AR$_0$-AR$_i$, to retrieve content stored in the respective entry. It should be understood that indexing via the unique integer AR may be performed via a unique identifier thereof.

Each entry of the plurality of entries of the integer-register mapper table 121, namely entry$_0$-entry$_i$, is configured to reference a unique integer PR of the integer PRs 120 of the OoO processor (not shown). Such referencing may be performed by storing a unique identifier of the respective integer PR in the respective entry. As such, the integer-register mapper table 121 may be indexed by the mapper 102 of FIG. 1B via a given integer AR of the plurality of integer ARs 119 to retrieve a given integer PR of the integer PRs 120, wherein the given integer AR is mapped to the given integer PR.

As such, the integer-register mapper table 121 is configured to store mappings between the plurality of integer ARs 119 and a set of integer PRs of the integer PRs 120. According to an example embodiment, the mapper 102 of FIG. 1B may be configured to initialize each entry of the plurality of entries entry$_0$-entry$_i$ of the integer-register mapper table 121 to reference respective unique integer PRs (e.g., integer PR$_0$-PR$_i$) of the integer PRs 120.

For example, a total number of integer ARs may be 36 and a total number of integer PRs may be 128. As such, the integer-register mapper table 121 may be initialized to map integer AR$_0$ through integer AR$_{35}$ to integer PR$_0$ through integer PR$_{35}$, respectively. Initialization may map such registers in consecutive order, for example, by mapping integer AR$_0$ to integer PR$_0$, integer AR$_1$ to integer PR$_1$, etc. It should be understood, however, that such mapping need not map the registers in consecutive order.

It should be understood that a total number of the plurality of integer ARs 119 may be less than a total number of the integer PRs 120 and, as such, a given number of integer PRs of the integer PRs 120 may not be mapped to respective integer ARs and may be referred to interchangeably herein as "unmapped" integer PRs or "free" integer PRs. The integer-PR free list 118 is configured to identify such free integer PRs, that is, the unmapped integer PRs. The integer-PR free list 118 may be implemented in any suitable way that identifiers the unmapped integer PRs.

For example, the integer-PR free list 118 may be a memory with multiple entries used to store a listing of free integer PRs by storing identifiers of the free integer PRs in the entries. Alternatively, the integer-PR free list 118 may be a memory that is configured to store a vector(s) with bits corresponding to the integer PRs 120. The mapper 102 of FIG. 1B may be configured to configure a given bit corresponding to a given integer PR in the vector based on whether the given integer PR is free or mapped to a given integer AR. According to an example embodiment, the OoO processor may include 128 integer PRs. As such, the integer- PR free list 118 may be a 128-bit vector. It should be understood that a total number of integer PRs is not limited to 128 and that the integer-PR free list 118 is not limited to a 128-bit vector.

It should be understood that a total number i of the plurality of integer ARs 119 may be any total number of integer ARs that is supported by the OoO processor. Referring back to FIG. 1B, the integer ARs (not shown) of the instructions 104 are from among the plurality of integer ARs 119 of the OoO processor that may be used to index the integer-register mapper table 121, as disclosed above with regard to FIG. 1C.

The mapper 102 is further configured, for each instruction, to determine whether the instruction includes at least one instance of an integer AR used as a destination. For each at least one instance, the mapper 102 changes the integer mapper state 108 and stores information regarding the change in an entry of a journal, such as disclosed below with regard to FIG. 1E. For each at least one instance, the mapper 102 removes a free integer PR from the integer-PR free list 118 and changes a present mapping for the integer AR in the integer-register mapper table 121 such that the integer AR is mapped to the free integer PR. As such, both the integer-register mapper table 121 and integer-PR free list 118 are modified based on each at least one instance causing the integer mapper state 108 to change. As disclosed above, the integer mapper state 108 represents the integer-register mapper table 121 and integer-PR free list 118 in their respective present states. Thus, any change to the integer-register mapper table 121 or integer-PR free list 118 causes a change in state of the integer mapper state 108.

As disclosed above, the mapper 102 employs the integer-register mapper table 121 to map integer ARs used as sources in the instructions and uses a combination of the integer-register mapper table 121 and integer-PR free list 118 to map integer ARs used as destinations in the instructions 104. The system 100 further comprises an FP-register mapper table and an FP physical register (PR) free list, such as disclosed below with reference to FIG. 1D.

The FP mapper state 110 may represent the FP-register mapper table in its present state and the FP-PR free list in its present state. Presence of an FP AR used as a destination register in an instruction causes a change to the FP-register mapper table and the FP-PR free list, as disclosed further below. As such, presence of an FP AR used as a destination register in an instruction causes a change to the FP mapper state 110, as disclosed below with regard to FIG. 1D.

Figure 1D:
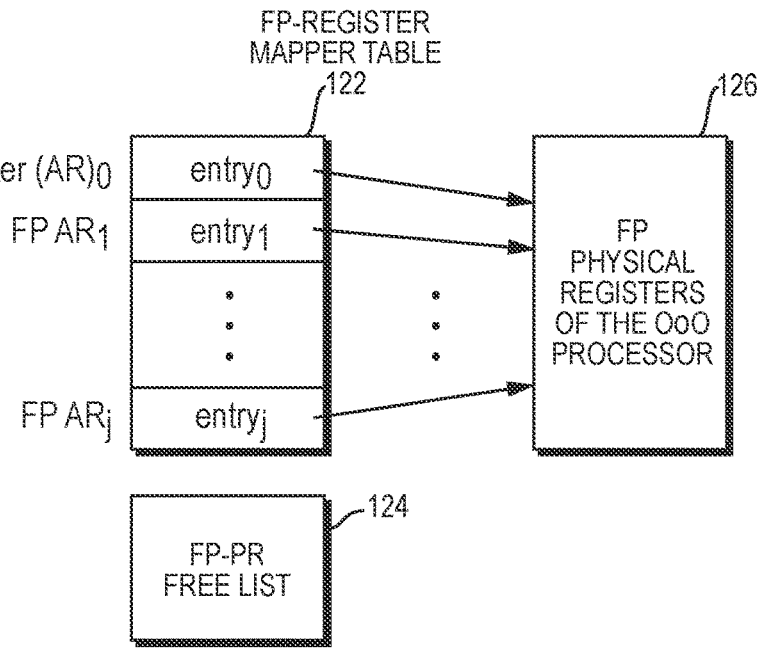
FIG. 1D is a block diagram of an example embodiment of a floating-point (FP) register mapper table and an FP-PR free list.

FIG. 1D is a block diagram of an example embodiment of an FP-register mapper table and an FP-PR free list that may be employed in the system 100. The FP mapper state 110 disclosed above with reference to FIG. 1B, may represent the FP-register mapper table 122 in its present state and the FP-PR free list 124 in its present state.

With reference to FIG. 1B and FIG. 1D, to map the instructions 104, the mapper 102 may be further configured, for each instruction, to determine whether the instruction includes at least one instance of an FP AR used as a source. In an event the instruction includes the at least one instance, the mapper 102 may be further configured to use the FP mapper register table 122 to map a respective integer AR of each instance of the at least one instance to a respective FP PR of the FP PRs 126 of the OoO processor. As such, no change is made to either the FP-register mapper table 122 or the FP-PR free list 124 and, thus, no change is made to the FP mapper state 110 for mapping FP ARs used as sources in the instructions 104.

According to the example embodiment of FIG. 1D, the FP-register mapper table 122 is a lookup table (LUT) that includes a plurality of entries, namely, $entry_0$-$entry_j$. Each entry of the plurality of entries $entry_0$-$entry_j$ of the LUT, that is, the FP-register mapper table 122, is indexed via a unique AR of a plurality of FP ARs 125 of the OoO processor, namely FP $AR_0$-$AR_j$, to retrieve content stored in the respective entry. It should be understood that indexing via the unique FP AR may be performed via a unique identifier thereof. According to an example embodiment, a number of the plurality of FP ARs 125 may be 32 while a number of the plurality of integer ARs 119, disclosed above with regard to FIG. 1C, may be 36. It should be understood, however, that the number of the plurality of integer ARs 119 and the number of the plurality of FP ARs 125 is not limited to 36 and 32, respectively. It should also be understood that the integer-register mapper table 121 of FIG. 1C, disclosed above, and the FP-register mapper table 122 of FIG. 1D may be implemented as a single table that is hierarchically subdivided.

Each entry of the plurality of entries of the FP-register mapper table 122, namely $entry_0$-$entry_j$, is configured to reference a unique FP PR of the FP PRs 126 of the OoO processor (not shown). Such referencing may be performed by storing a unique identifier of the respective FP PR in the respective entry. As such, the FP-register mapper table 122 may be indexed by the mapper 102 of FIG. 1B via a given FP AR of the plurality of FP ARs 125 to retrieve a given FP PR of the FP PRs 126, wherein the given FP AR is mapped to the given FP PR. As such, the FP-register mapper table 122 is configured to store mappings between the plurality of FP ARs 125 and a set of FP PRs of the FP PRs 126. According to an example embodiment, the mapper 102 of FIG. 1B may be configured to initialize each entry of the plurality of entries $entry_0$-$entry_j$ of the FP-register mapper table 122 to reference respective unique FP PRs (e.g., FP $PR_0$-$PR_j$) of the FP PRs 126.

For example, a total number of FP ARs may be 32 and a total number of FP PRs may be 96. As such, the FP-register mapper table 122 may be initialized to map FP $AR_0$ through FP $AR_{31}$ to FP $PR_0$ through $PR_{31}$, respectively. Initialization may map such registers in consecutive order, for example, by mapping FP $AR_0$ to FP $PR_0$, FP $AR_1$ to FP $PR_1$, etc. It should be understood, however, that such mapping need not map the registers in consecutive order.

It should be understood that a total number of the plurality of FP ARs 125 may be less than a total number of the FP PRs 126 and, as such, a given number of FP PRs of the FP PRs 126 may not be mapped to respective FP ARs and may be referred to interchangeably herein as "unmapped" FP PRs or "free" FP PRs. The FP-PR free list 124 is configured to identify free FP PRs (not shown), that is, unmapped FP PRs (not shown). The FP-PR free list 124 may be implemented in any suitable way.

For example, the FP-PR free list 124 may be a memory with multiple entries to store a listing of free FP PRs by storing identifiers of the free FP PRs in the entries. Alternatively, the FP-PR free list 124 may be a memory that is configured to store a vector(s) with bits corresponding to the FP PRs 126. The mapper 102 of FIG. 1B may be configured to configure a given bit corresponding to a given FP PR in the vector based on whether the given FP PR is free or mapped to a given FP AR. According to an example embodiment, the OoO processor may include 96 FP physical registers. As such, the FP-PR free list 124 may be a 96-bit vector. It should be understood that a total number of FP physical registers is not limited to 96 and that the FP-PR free list 124 is not limited to a 96-bit vector.

It should be understood that a total number j of the plurality of FP ARs 125 may be any total number of FP ARs that are supported by the OoO processor. Referring back to FIG. 1B, the FP ARs (not shown) of the instructions 104 are from among the plurality of FP ARs 125 of the OoO processor that may be used to index the FP-register mapper table 122. The mapper 102 is further configured, for each instruction of the instructions 104, to determine whether the instruction includes at least one instance of an FP AR used as a destination.

If there is at least one instance of an FP AR used as a destination, the mapper 102 records same via the at least one FP indicator 112, as disclosed further below. For each at least one instance, the mapper 102 changes the FP mapper state 110 and stores information regarding the change in an entry of a journal, such as disclosed below with regard to FIG. 1E. For each at least one instance, the mapper 102 removes a free FP PR from the FP-PR free list 124 and changes a present mapping for the FP AR in the FP-register mapper table 122 such that the FP AR is mapped to the free FP PR. As such, both the FP-register mapper table 122 and FP-PR free list 124 are modified based on each at least one instance causing the FP mapper state 110 to change. As disclosed above, the FP mapper state 110 represents the FP-register mapper table 122 and FP-PR free list 124 in their respective present states. Thus, any change to the FP-register mapper table 122 or FP-PR free list 124 causes a change in state of the FP mapper state 110.

As disclosed above, the mapper 102 employs the FP-register mapper table 122 to map FP ARs used as sources in the instructions and uses a combination of the FP-register mapper table 122 and FP-PR free list 124 to map FP ARs used as destinations in the instructions 104. As disclosed above, a journal may be used to record change(s) or lack thereof that are made to the integer mapper state 108 or FP mapper state 110 by the mapper 102 for mapping the instructions 104. The mapper 102 may be further configured to write a respective entry (not shown) to the journal for each instruction of the instructions 104, such as disclosed below with regard to FIG. 1E.

Figure 1E:
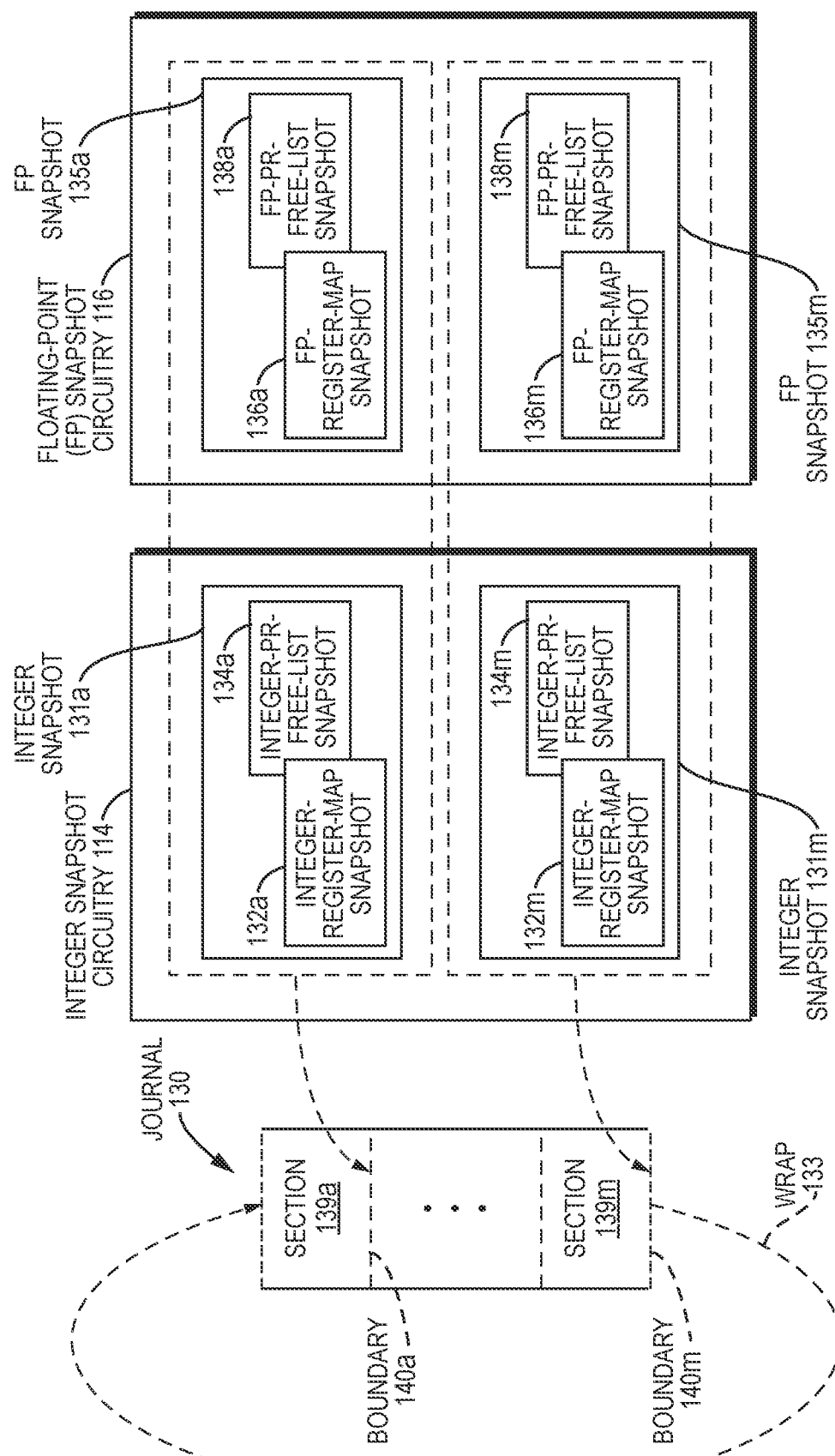
FIG. 1E is a block diagram of an example embodiment of a journal, integer snapshot circuitry, and FP snapshot circuitry.

FIG. 1E is a block diagram of an example embodiment of a journal 130, integer snapshot circuitry 114, and FP snapshot circuitry 116 that may be employed in the system 100. To map the instructions, the mapper 102 may be further configured, for each instruction, to write an entry to the journal 130 for the instruction. The entry may be associated with a mapper identifier that is also associated with the instruction. Content of the entry may represent an effect or lack thereof on the integer mapper state 108 or FP mapper state 110 that resulted from mapping of the instruction by the mapper 102. Such content may be used for unwinding instructions as disclosed below with regard to FIG. 1G. As disclosed above with reference to FIG. 1C, no change is made to the integer mapper state 108 for mapping integer ARs used as sources in the instructions 104 and, as disclosed above with reference to FIG. 1D, no change is made to the FP mapper state 110 for mapping FP ARs used as sources in the instructions 104.

According to an example embodiment, the mapper 102 may be further configured to map a given number of instructions, also referred to interchangeably herein as a bundle, on a cycle-by-cycle basis, and to write at least one entry, of the given number, to the journal 130, on the cycle-by-cycle basis. According to an example embodiment, the given number, that is, a size of the bundle, may be four.

As such, in a given cycle, the mapper 102 may consult the integer mapper state 108, FP mapper state 110, or a combination thereof, 4 times in a given cycle and write 4 entries to the journal 130 in a given cycle.

In an event an actual number of instructions received in a cycle is less than the given number, the mapper 102 may be further configured to write the at least one entry, of the given number, to the journal 130 and, in at least one respective entry of the at least one entry written, indicate via the content that the effect is no effect. A total number of the at least one respective entry, that is, those entries corresponding to instructions that were not received in the cycle, is a difference between the given number and the actual number. For example, if a bundle size is four, that is, if the given number is four, and three instructions are received in the cycle, the total number of entries written to the journal 130 is four; however, one entry is written to indicate via the content that the effect is no effect because the entry is not associated with a particular instruction that was mapped.

The effect is also no effect in an event the instruction has no instance of either an integer or FP AR used as a destination. As such, mapper 102 may be further configured to indicate, via the content of the entry of the journal 130, that no change to either the integer mapper state 108 or the FP mapper state 110 resulted from mapping the instruction. Such would be the case, for example, for cases in which an instruction did not include any AR, either integer or FP, that was used as a destination.

In an event the instruction includes at least one instance of an integer AR used as a destination, the effect includes at least one change to the integer mapper state 108. The mapper 102 may be further configured to include in the content of the entry written to the journal 130, for each instance of the at least one instance, the integer AR (not shown), a present integer PR (not shown), and a next integer PR (not shown). For example, at a time of mapping the instruction, the integer-register mapper table 121, in its present state at the time, includes a mapping between the integer AR and the present integer PR. Prior to mapping of the instruction, that is, preceding the mapping of the instruction, the next integer PR is a free integer PR included in the integer-PR free list 118. To map the integer AR used as the destination, the mapper 102 removes that free integer PR from the integer-PR free list 118 and changes the mapping to be between the integer AR and a next integer PR, where the next integer PR is the free integer PR that was removed from the integer-PR free list 118. As such, mapping the instruction causes the mapper 102 to map the integer AR of the instruction to the next integer PR.

As such, both the integer-register mapper table 121 and the integer-PR free list 118 are changed based on the at least one instance of an integer AR used as a destination. Thus, the integer mapper state 108 is changed based on encountering at least one instance of an integer AR used as a destination in the instruction. In an event the mapper 102 is notified of completion of the instruction by the OoO processor, the mapper 102 may be further configured to retire the entry from the journal 130 and add, based on the content, the present integer PR of each instance of the at least one instance to the integer-PR free list 118.

In an event the instruction includes at least one instance of an FP AR used as a destination, the effect includes at least one change to the FP mapper state 110. The mapper 102 is further configured to update the at least one FP indicator 112 to record a presence of at least one FP AR in the instruction, and to include, in the content of the entry of the journal 130, for each at least one instance, the FP AR (not shown), a present FP PR (not shown), and a next FP PR (not shown). For example, at a time of mapping the instruction, the FP-register mapper table 122, in its present state at the time, includes a mapping between the FP AR and the present FP PR. Prior to mapping of the instruction, that is, preceding mapping of the instruction, the next FP PR is a free FP PR included in the FP-PR free list 124. The mapper 102 is further configured to remove the free FP PR from the FP-PR free list 124 and change the mapping to be between the FP AR and a next FP PR, where the next FP PR is the free FP PR that was removed from the FP-PR free list 124. As such, mapping the instruction causes the mapper 102 to map the FP AR of the instruction to the next FP PR. In an event the mapper 102 is notified of completion of the instruction by the OoO processor, the mapper 102 may be further configured to retire the entry from the journal 130 and add, based on the content, the present FP PR of each instance of the at least one instance to the FP-PR free list 124.

The journal 130 is partitioned into a plurality of sections that include the section 139a through the section 139m, with respective boundaries therebetween. With reference to FIGS. 1B and 1E, the mapper 102 may be configured to write a respective entry to the journal 130 for each instruction of the instructions 104. The mapper 102 may be configured to copy the integer mapper state 108 to the integer snapshot circuitry 114, periodically, responsive to a change (not shown) in sections of the journal 130 written to by the mapper 102. The change is between consecutive sections. The mapper 102 may be configured to copy the FP mapper state 110 to the FP snapshot circuitry 116, intermittently, based on the at least one FP present indicator 112 and the change in sections. Copying of the FP mapper state 110 may be intermittent as such copying may be blocked, intermittently, based on the at least one FP present indicator 112.

It should be understood that a total number of the sections 139a-m of the journal 130 may be any number of sections. According to an example embodiment, the total number of the sections may be 4. According to an example embodiment, a total number of entries of the journal may be 128 and a total number of entries within each section may be 32.

The journal 130 may be a circular buffer with a head pointer (not shown) and a tail pointer (not shown). As such, sections of the journal 130 wrap 133, with a first section, that is, section 139a, following a last section, that is, section 139m, in the journal 130. The mapper 102 may be further configured to detect the change in sections based on a modification made to the head pointer. For example, the head pointer may reference a present entry in the journal. To write a new entry to the journal 130, that is, to add the new entry, the mapper 102 modifies the head pointer to reference the new entry in the journal 130. The mapper 102 may detect the change in an event the present entry and the new entry are located in different sections of the journal 130, in which case, the modification causes the head pointer to reference a different section from a previous section referenced immediately prior to the modification.

As disclosed above, each entry of the journal 130 may be associated with a mapper ID that is also associated with a respective instruction that corresponds to the entry. As such, sections of the journal 130 may be associate with a respective set of mapper identifiers (IDs) and the mapper 102 may detect the change based on a respective mapper ID of an instruction that is being mapped.

According to the example embodiment, the integer snapshot circuitry 114 includes a respective integer snapshot associated with each boundary between sections of the journal. Each integer snapshot includes a respective integer-register-map snapshot and respective integer-PR-free-list snapshot. For example, the integer snapshot circuitry 114 includes the integer snapshot 131a that is associated with the boundary 140a, that is, a first boundary of the journal 130. The integer snapshot 131a includes the integer-register-map snapshot 132a and the integer-PR-free-list snapshot 134a. The integer snapshot circuitry 114 further includes the integer snapshot 131m that is associated with the boundary 140m, that is, a last boundary of the journal 130 and includes the integer-register-map snapshot 132m and the integer-PR-free-list snapshot 134m.

Each respective integer-register-map snapshot, that is, each of the integer-register-map snapshots 132a-m, includes a respective arrangement of circuitry (not shown) for storing a respective copy of the integer-register mapper table 121, disclosed above with reference to FIG. 1C. Each respective integer-PR free list, that is, each of the integer-PR-free-list snapshots 134a-m, includes a respective arrangement of circuitry (not shown) for storing a respective copy of the integer-PR free list 118, disclosed above with reference to FIG. 1C.

According to the example embodiment, the FP snapshot circuitry 116 includes a respective FP snapshot associated with each boundary between sections of the journal. Each FP snapshot includes a respective FP-register-map snapshot and respective FP-PR-free-list snapshot. For example, the FP snapshot circuitry 116 includes the FP snapshot 135a that includes the FP-register-map snapshot 136a and the FP-PR-free-list snapshot 138a and is associated with the boundary 140a, that is, a first boundary of the journal 130. The FP snapshot circuitry 116 further includes the FP snapshot 135m that includes the FP-register-map snapshot 136m and the FP-PR-free-list snapshot 138m and is associated with the boundary 140m, that is, a last boundary of the journal 130.

Each respective FP-register-map snapshot, that is, each of the FP-register-map snapshots 136a-m, includes a respective arrangement of circuitry (not shown) for storing a respective copy of the FP-register mapper table 122, disclosed above with reference to FIG. 1D. Each respective FP-PR free list, that is, each of the FP-PR-free-list snapshots 138a-m, includes a respective arrangement of circuitry (not shown) for storing a respective copy of the FP-PR free list 124, disclosed above with reference to FIG. 1D.

Referring to FIGS. 1B, 1C, and 1E, to copy the integer mapper state 108 to the integer snapshot circuitry 114, the mapper 102 may be further configured to copy, in response to the change in sections of the journal 130, (i) the integer-register mapper table 121 to a given integer-register-map snapshot of the plurality of integer-register-map snapshots 132a-m included in the integer snapshot circuitry 114 and (ii) the integer-PR free list 118 to a given integer-PR-free-list snapshot of the plurality of integer-PR-free-list snapshots 134a-m included in the integer snapshot circuitry 114. The given integer-register-map snapshot and the given integer-PR-free-list snapshot are associated with a given boundary of the respective boundaries. The given boundary is crossed based on the change.

For example, in an event the change is from the last section, that is, the section 139m, to the first section, that is, the section 139a, the given boundary is the boundary 140m. As such, the given integer-register-map snapshot is the integer-register-map snapshot 132m and the given integer-PR-free-list snapshot is the integer-PR-free-list snapshot 134m that are both associated with the boundary 140m. In response to the change, the mapper 102 copies the integer-register mapper table 121 to the integer-register-map snapshot 132m and copies the integer-PR free list 118 to the integer-PR-free-list snapshot 134m.

Further, in an event copying of the FP mapper state 110 to the FP snapshot circuit 116 is enabled based on the at least one FP present indicator 112, the mapper 102 may be further configured to copy, in response to the change, (i) the FP-register mapper table 122 to a given FP-register-map snapshot of the plurality of FP-register-map snapshots 136a-m included in the FP snapshot circuitry 116 and (ii) the FP-PR free list 124 to a given FP-PR-free-list snapshot of the plurality of FP-PR-free-list snapshots 138a-m included in the FP snapshot circuitry 116. The given FP-register-map snapshot and the given FP-PR-free-list snapshot are associated with the given boundary that is crossed based on the change.

As such, continuing with the example, the given FP-register-map snapshot is the FP-register-map snapshot 136m and the given FP-PR-free-list snapshot is the FP-PR-free-list snapshot 138m that are both associated with the boundary 140m. It should be understood that the foregoing example is for illustrative purposes and that any boundary between sections of the journal 130 may be crossed due to the change and, thus, the given integer and FP register map and free list snapshots that are employed for the copying may be different, based on which boundary is crossed.

According to an example embodiment, the at least one FP present indicator 112 may include a plurality of FP present indicators. Alternatively, a counter may be employed as the at least one FP present indicator as disclosed, further below. In an event the at least one FP present indicator 112 includes the plurality of FP present indicators, each FP present indicator of the plurality of FP present indicators may be associated, on a one-to-one basis, with a respective section of the plurality of sections of the journal 130, such as disclosed below with regard to FIG. 1F.

Figure 1F:
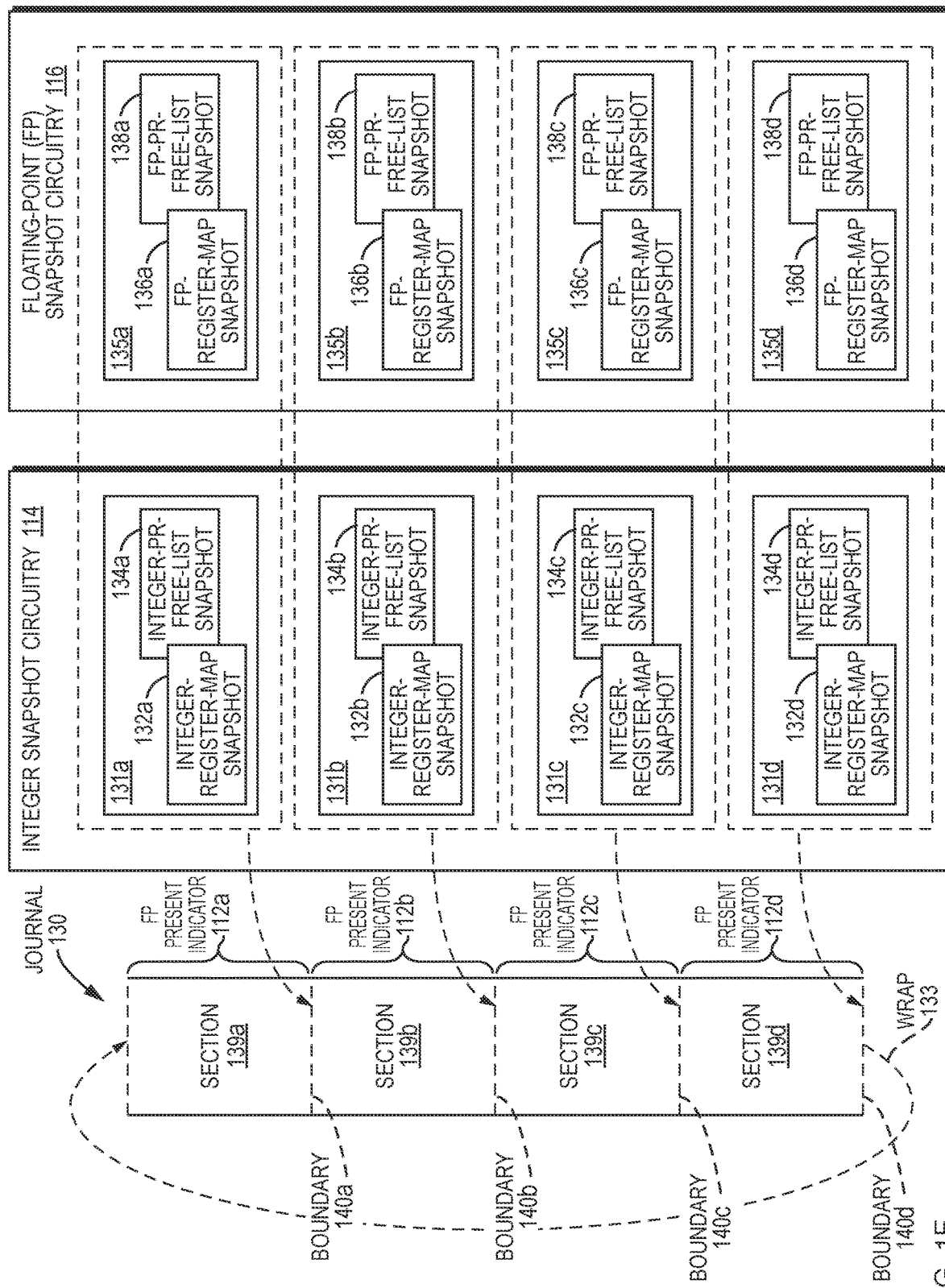
FIG. 1F is a block diagram of an example embodiment of at least one FP present indicator.

FIG. 1F is a block diagram of an example embodiment of the at least one FP present indicator 112 that may be employed in the system 100 of FIG. 1B, disclosed above. In the example embodiment of FIG. 1F, the at least one FP present indicator includes a plurality of FP present indicators, namely the FP present indicator 112a, FP present indicator 112b, FP present indicator 112c, and FP present indicator 112d. A given FP present indicator of the plurality of FP present indicators is associated with a given section and represents whether there is at least one instruction associated with an entry in that section that uses an FP AR as a destination. As such, each FP present indicator may be used to indicate whether an FP AR has been used over a span of a given number of instructions. For example, if a section of the journal 130 includes 32 entries and the FP present indicator for that section is clear, then it is understood that no FP AR has been used as a destination over the span of 32 instructions associated with those 32 entries.

It should be understood that for an FP present indicator to be "clear," the FP present indicator may have a value of zero, and that for the FP present indicator to be "set," the FP present indicator may have a value that is non-zero. It should be understood, however, that other values may be used to designate whether the FP present indicator is clear or set so long as such value are different relative to one another.

Each FP present indicator, that is, each of the FP present indicators 112a-d, is associated, on a one-to-one basis, with a respective section of the plurality of sections, namely the sections 139a-d of the journal 130. As such, since the journal 130 is partitioned into four sections, there are four FP present indicators in the example embodiment.

It should be understood that a number of sections of the journal 130 is not limited to four and, thus, a number of the FP present indicators is not limited to four. Since the number of sections of the journal 130 is four in the example embodiment, there are four boundaries therebetween, namely, the boundary 140a, the boundary 140b, the boundary 140c, and the boundary 140d.

In the example embodiment, the integer snapshot circuitry 114 includes circuitry for storing four integer snapshots of the integer mapper state 108, namely a first integer snapshot 131a, second integer snapshot 131b, third integer snapshot 131c, and fourth integer snapshot 131d. Each integer snapshot includes circuitry for storing a respective pairing of an integer register snapshot and integer-PR-free-list snapshot associated with a respective boundary.

For example, in the example embodiment, the integer snapshot circuitry 114 includes the integer-register-map snapshot 132a and the integer-PR-free-list snapshot 134a that are both associated with the boundary 140a. The integer snapshot circuitry 114 includes the integer-register-map snapshot 132b and the integer-PR-free-list snapshot 134b that are both associated with the boundary 140b. The integer snapshot circuitry 114 includes the integer-register-map snapshot 132c and the integer-PR-free-list snapshot 134c that are both associated with the boundary 140c. The integer snapshot circuitry 114 includes the integer-register-map snapshot 132d and the integer-PR-free-list snapshot 134d that are both associated with the boundary 140d.

Similarly, the FP snapshot circuitry 116 includes circuitry for storing four FP snapshots of the FP mapper state 110, namely a first FP snapshot 135a, second FP snapshot 135b, third FP snapshot 135c, and fourth FP snapshot 135d. Each FP snapshot includes a respective pairing of an FP register snapshot and FP-PR-free-list snapshot associated with a respective boundary. For example, in the example embodiment, the FP snapshot circuitry 116 includes the FP-register-map snapshot 136a and the FP-PR-free-list snapshot 138a that are both associated with the boundary 140a. The FP snapshot circuitry 116 includes the FP-register-map snapshot 136b and the FP-PR-free-list snapshot 138b that are both associated with the boundary 140b. The FP snapshot circuitry 116 includes the FP-register-map snapshot 136c and the FP-PR-free-list snapshot 138c that are both associated with the boundary 140c. The FP snapshot circuitry 116 includes the FP-register-map snapshot 136d and the FP-PR-free-list snapshot 138d that are both associated with the boundary 140d.

To copy the integer mapper state 108 to the integer snapshot circuitry 114, the mapper 102 may be further configured to copy, in response to the change in sections of the journal 130, (i) the integer-register mapper table 121 to a given integer-register-map snapshot of the plurality of integer-register-map snapshots 132a-d included in the integer snapshot circuitry 114 and (ii) the integer-PR free list 118 to a given integer-PR-free-list snapshot of the plurality of integer-PR-free-list snapshots 134a-d included in the integer snapshot circuitry 114.

The given integer-register-map snapshot and the given integer-PR-free-list snapshot employed in the copying are the respective snapshots that are associated with the given boundary that is crossed based on the change. As such, the mapper 102 is configured to copy, periodically, the integer mapper state 108 to the integer snapshot circuitry 114, that is, each time there is a change in sections of the journal 130 that is written to by the mapper 102. As disclosed above and in further detail further below, the mapper 102 writes an entry to the journal 130 for each instruction of the instructions 104 that are mapped and, as a result, changes sections of the journal 130 each time a section is filled.

In contrast to copying the integer mapper state 108, periodically, in response to the change in sections of the journal 130, the mapper 102 may copy the FP mapper state 110 intermittently, based on the change and the plurality of FP present indicators 112a-d, namely, the FP present indicators 112a-d. Such copying may be intermittent because, while a section may be filled and a change in sections occurs, copy to the FP snapshot circuitry 116 may be blocked in an event there is a single FP present indicator of the plurality of FP present indicators 112a-d that is set.

According to an example embodiment, each FP present indicator of the plurality of FP present indicators may be initialized to be set. For example, example each FP present indicator of the plurality of FP present indicators 112a-d may be initialized to be set. For example, each FP present indicator of the plurality of FP present indicators 112a-d may be initialized with a value of one. It should be understood that an FP present indicator that is "set" is not limited to having its value be one and that an FP present indicator that is "clear" is not limited to having its value be zero. Such values of one and zero are used for illustrative purpose. While each FP present indicator is initialized to be set, values for the FP present indicators may be altered by the mapper 102, as disclosed in detail further below, thereby controlling whether or not copying of the FP mapper state 110 to the FP snapshot circuit 116 is enabled or blocked.

In an event copying of the FP mapper state 110 to the FP snapshot circuit 116 is enabled based on the FP present indicators 112a-d, the mapper 102 is further configured to copy, in response to the change, (i) the FP-register mapper table 122 to a given FP-register-map snapshot of the plurality of FP-register-map snapshots 136a-d included in the FP snapshot circuitry 116 and (ii) the FP-PR free list 124 to a given FP-PR-free-list snapshot of the plurality of FP-PR-free-list snapshots 138a-d included in the FP snapshot circuitry 116. The given FP-register-map snapshot and the given FP-PR-free-list snapshot are the respective snapshots that are associated with the given boundary, namely, the boundary 140a, boundary 140b, boundary 140c, or boundary 140d, that is crossed based on the change.

The mapper 102 is configured to read each FP present indicator of the plurality of FP present indicators in response to the change. As such, in response to crossing any of the boundaries 140a-d, the mapper 102 reads each of the FP present indicators 112a-d. In an event each FP present indicator of the FP present indicators 112a-d is clear, the mapper is configured to disable copying of the FP mapper state 110 to the FP snapshot circuitry 116.

In the event that each FP present indicator of the FP present indicators 112a-d is clear, it is understood that such a copy is unnecessary because the copy would not change the FP mapper state 110 that is presently stored in the FP snapshot circuitry 116. Such an understanding is based on an observation that no FP ARs have been used as destinations in the instructions 104 over a given number of the instructions. Presence of FP ARs used as destinations in the instructions 104 causes the FP mapper state 110 to change, as disclosed in detail, further below.

In an event at least a single FP present indicator of the FP present indicators 112a-d is set, the mapper 102 is configured to copy, in response to the change, the FP mapper state 110 to the FP snapshot circuitry 116 in addition to copying the integer mapper state 108 to the integer snapshot circuitry 114. The mapper 102 is further configured to clear a given FP present indicator of the plurality of FP present indicators. The given FP present indicator that is cleared is associated with the section that is being transitioned into.

For example, in an event the boundary 140a is crossed, the FP present indicator 112b that is associated with the section 139b, would be cleared by the mapper 102. By clearing the FP present indicator 112b, the section 139b is marked as having no association with an instruction that uses an FP AR as a destination. As instructions are mapped and the entries to the section 139b are written by the mapper 102, the mapper 102 may set the FP present indicator 112b in an event an instruction associated with an entry in the section 139b uses an FP AR as a destination.

As disclosed above, in an alternative embodiment, the at least one FP present indicator 112 may be a counter (not shown). In an event the counter is zero, the mapper 102 may be further configured to disable copying of the FP mapper state 110 to the FP snapshot circuitry 116. As such, in response to the change, the mapper 102 copies the integer mapper state 108 to the integer snapshot circuitry 114 but does not copy the FP mapper state 110. In an event the counter is non-zero, in response to the change, the mapper 102 copies the integer mapper state 108 to the integer snapshot circuitry 114 and, since copy to the FP snapshot circuitry 116 is enabled due to the non-zero value of the counter, the mapper 102 also copies the FP mapper state 110 to the FP snapshot circuitry 116.

The journal 130 may be a circular buffer configured to store at most a maximum number of entries. According to an example embodiment, the maximum number of entries is 128. It should be understood, however, that the maximum number of entries may be any number that corresponds to a maximum number of instructions that can be in-flight in the OoO processor.

The mapper 102 may be further configured to set the counter to twice the maximum number of entries in an event the instruction includes at least one instance of an FP AR used as a destination. The mapper 102 may be further configured to set the counter to twice the maximum number of entries in an event the counter is non-zero and a request for instruction unwinding is received. Such a request may be received from an issue unit (not shown) in the form of a notification, such as disclosed further below, that is provided by the issue unit along with a mapper identifier of a given instruction. The given instruction may be associated with the restart event. For example, execution of the given instruction may have caused the restart event.

The mapper 102 may be further configured to decrement the counter in an event the instruction does not include at least one instance of an FP AR used as a destination. The mapper 102 may be further configured to disable copying of the FP mapper state 110 to the FP snapshot circuitry 116, in an event the counter is zero, thus effecting power savings. The counter with the value of zero indicates that each FP snapshot 135a-d of the FP snapshot circuitry 116 is identical to the FP mapper state 110. The mapper 102 may be further configured to enable copying of the FP mapper state 110 to the FP snapshot circuitry 116, in an event the counter is non-zero. The counter having a non-zero value signifies that the FP mapper state 110 is not identical to each FP snapshot 135a-d. An example embodiment in which the at least one FP present indicator 112 is the counter may be simpler to implement relative to an example embodiment in which the FP present indicator 112 includes a plurality of FP present indicators, however, the counter implementation may be slightly slower at detecting when copying from/to the FP snapshot circuitry 116 can be obviated.

Whether the at least one FP present indicator is employed to include a plurality of FP present indicators or is employed as a counter, the at least one FP present indicator is used to effect power savings of the OoO processor as a value(s) thereof may be used to determine when to block a snapshot of the FP mapper state 110 from being captured. Integer and FP snapshots are captured to expedite unwinding of instructions, such as disclosed below with regard to FIG. 1G, however, if an FP AR has not been used in an instruction over a number of instructions, it can be determined that such a copy would be of no benefit as the FP mapper state 110 has not been modified based on mapping the number of instructions.

Figure 1G:
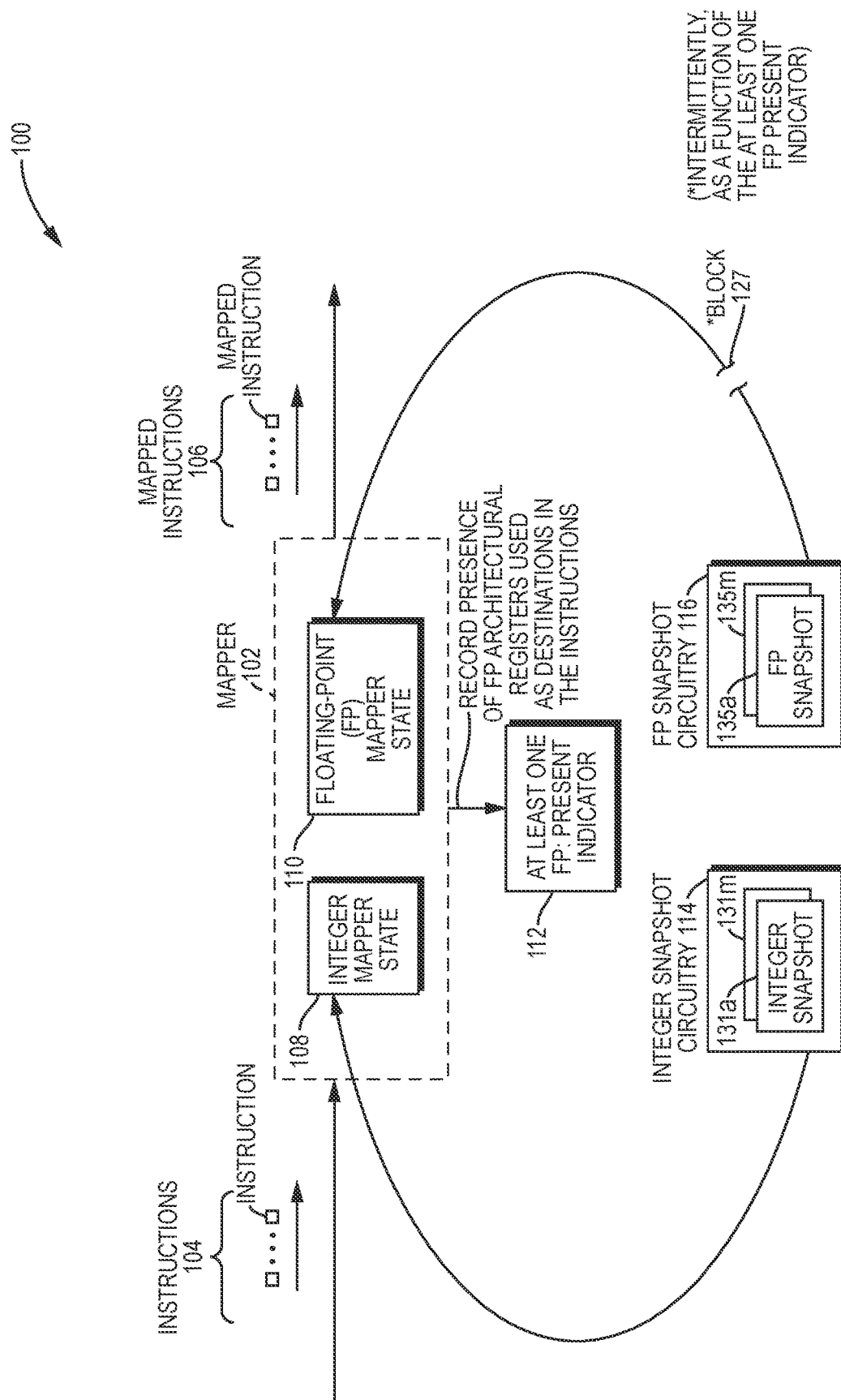
FIG. 1G is a block diagram of an example embodiment of the system of FIG. 1A that may be used for unwinding instructions in the OoO processor.

FIG. 1G is a block diagram of an example embodiment of the system 100 that may be used for unwinding instructions in the OoO processor. Since the OoO processor executes instructions out-of-order, that is, not according to a program order of the instructions generated by a compiler, instructions may need to be unwound in an event a restart event, such as an exception, branch/jump mispredict, etc., occurs. For example, a given instruction may be executed by the OoO processor causing the restart event. Since the OoO processor can execute out-or-order, instructions subsequent to the given instruction in the program order may have already been executed, even though such instructions follow the given instruction in the program order. Such instructions, that is, the subsequent instruction(s) following the given instruction in the program order, would be unwound by backing out any integer or FP mapper state changes that were made based on their mapping. Backing out such state changes is performed in an order that is reverse relative to the order in which they were applied. As such, unwinding undoes (i.e., reverses or unrolls) state changes made to the integer mapper state 108, FP mapper state 110, or a combination thereof, caused by mapping of the subsequent instruction(s).

As disclosed above, mapping instructions that use registers as destination registers causes changes to a state of the mapper 102. Specifically, the integer mapper state 108 is changed as a result of mapping an integer AR that is used as a destination register, and the FP mapper state 110 is changed as a result of mapping an FP AR that is used as a destination register. According to the example embodiment of FIG. 1G, the mapper 102 may be configured, in response to a restart event causing at least one instruction to be unwound, to restore the present integer mapper state 108 and present FP mapper state 110 to a former integer mapper state (not shown) and former FP mapper state (not shown), respectively.

The present integer mapper state 108 and FP mapper state 110 are used by the mapper 102 for mapping the instructions 104, as disclosed above. Continuing with reference to FIG. 1G, the system 100 comprises the integer snapshot circuitry 114 and FP snapshot circuitry 116 that are configured to store the integer snapshots 131a-m and FP snapshots 135a-m of the present integer mapper state 108 and FP mapper state 110, respectively, to expedite restoration to the former integer and FP mapper state, respectively. Access to the FP snapshot circuitry 116 may be blocked, intermittently, as a function of the at least one FP present indicator 112 that is used by the mapper 102 to record presence of FP architectural registers (ARs) (not shown) used as destinations (not shown) in the instructions 104.

Restoring the present integer mapper state 108 and the present FP mapper state 110 to the former integer and FP mapper state, respectively, causes the former integer and FP mapper state to become the present integer mapper state 108 and the present FP mapper state 110, respectively.

The system 100 further comprises the integer-register mapper table 121 and integer physical register (PR) free list 118, disclosed above with regard to FIG. 1C. The present integer mapper state 108 represents the integer-register mapper table 121 in its present state and the integer-PR free list 118 in its present state. Each integer snapshot of the integer snapshots 131a-m includes respective copies of the integer-register mapper table 121 and integer-PR free list 118 stored at a respective point in time, that is, when a change in sections of the journal 130, written to by the mapper 102 during mapping, is detected by the mapper 102, such as disclosed above with regard to FIG. 1E and FIG. 1F.

The system 100 further comprises the FP-register mapper table 122 and FP-PR free list 124, disclosed above with regard to FIG. 1D. The present FP mapper state 110 represents the FP-register mapper table 122 in its present state and the FP-PR free list 124 in its present state. Each FP snapshot of the FP snapshots 135a-m includes respective copies of the FP-register mapper table 122 and FP-PR free list 124 stored at a respective point in time, that is, at a time when copying to the FP snapshot circuitry 116 was enabled and a change in sections of the journal 130, written to by the mapper 102, occurred during mapping, such as disclosed above with regard to FIG. 1E and FIG. 1F.

Continuing with reference to FIG. 1G, the system 100 further comprises a journal, such as the journal 130 of FIG. 1E or FIG. 1F, disclosed above, an issue unit (not shown) and execution unit (not shown). The issue unit may issue the mapped instructions 106 to the execution unit to execute. Execution of a given instruction may cause a restart event (not shown). The issue unit may notify the mapper 102 of the restart event and provide a mapper identifier (not shown) associated with the given instruction. The mapper 102 may be further configured to use the mapper identifier to locate a given entry in the journal that is associated with the given instruction and to unwind mapper state change(s) recorded in entries that the follow the given entry. The entries in the journal 130 that follow the given entry are associated with instructions that follow the given instruction in the program order. The mapper 102 may read those entries in reverse order to back out mapper state changes included therein, in a reverse order relative to an order applied during mapping. As disclosed above, such entries store integer mapper state changes made to the present integer mapper state 108 by the mapper 102 in order to map integer ARs used as destinations in the instructions 104, and store FP mapper state changes made to the present FP mapper state 110 by the mapper 102 in order to map FP ARs used as destinations in the instructions 104.

Prior to backing out the mapper state changes for unwinding the instructions, the mapper 102 may access the integer snapshot circuitry 114 to copy a given integer snapshot of the integer snapshots 131a-m to the integer mapper state 108 and may access the FP snapshot circuitry 116 to copy a given FP snapshot of the FP snapshots 135a-m to the FP mapper state 110. Access to the FP snapshot circuitry 116 may, however, be blocked based on the at least one FP present indicator. Such blocking prevents the copying of the given FP snapshot in an event the FP snapshots 135a-m are identical to the FP mapper state 110 and, thus, effects a power savings. Regardless of whether access is blocked, the mapper 102 uses entries of the journal to restore the integer mapper state 108 and FP mapper state 110 to the former integer and FP mapper state, respectively, as disclosed in further detail below with regard to FIG. 2.

Figure 2:
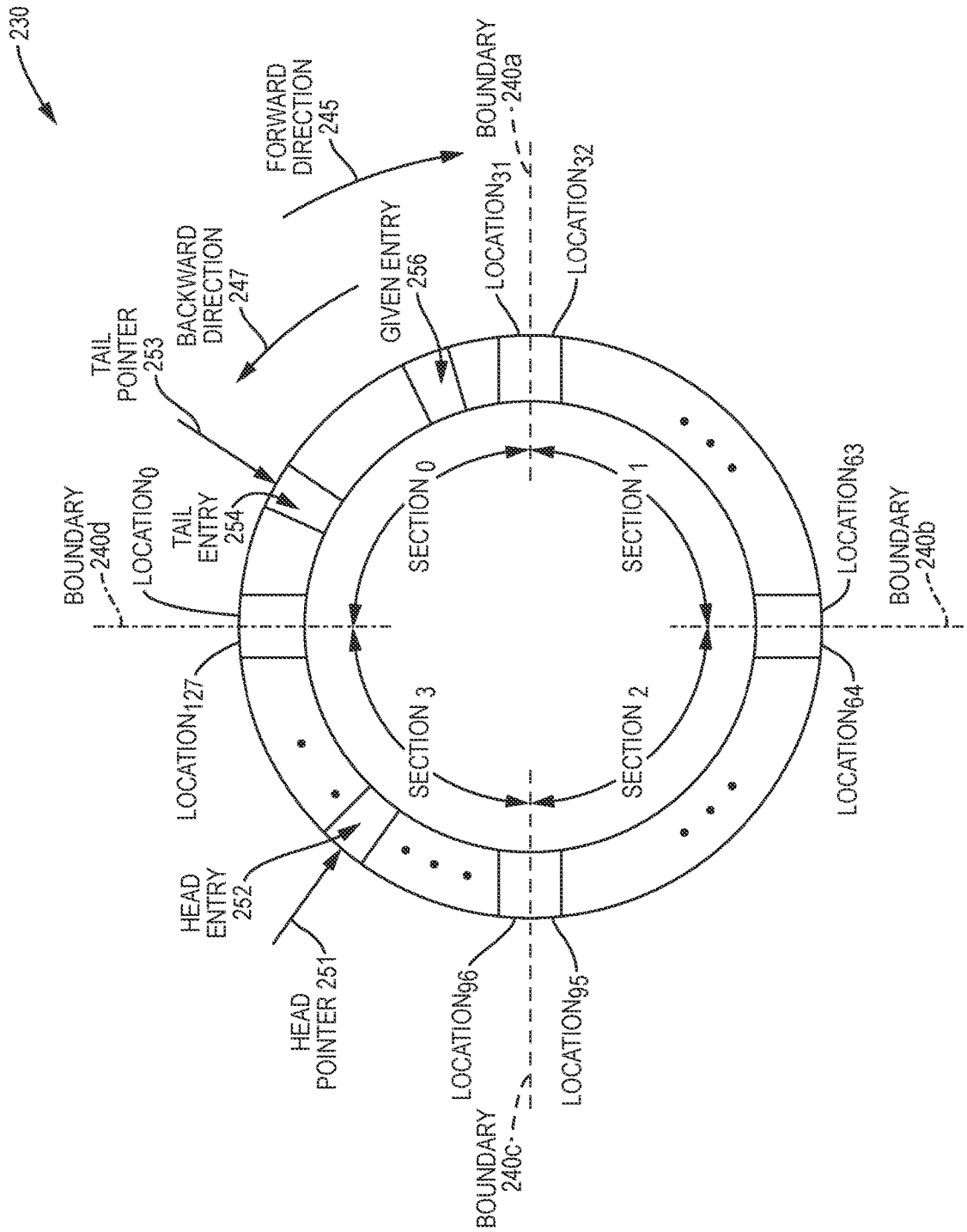
FIG. 2 is a block diagram of an example embodiment of a journal.

FIG. 2 is a block diagram of an example embodiment of a journal 230. The journal 230 may be employed as the journal 130 that is used in the system 100, as disclosed above. In the example embodiment, the journal 230 is a circular buffer configured to store a maximum of 128 entries and is partitioned into 4 sections, namely, section$_0$, section$_1$, section$_2$, and sections. Each of the sections is configured to store 32 entries. It should be understood that an example embodiment of a journal disclosed herein is not limited to storing 128 entries or to having 4 sections each configured to store 32 entries.

The sections of the journal 230 are separated by boundaries that include the boundary 240a, boundary 240b, boundary 240c, and boundary 240d. The boundaries separate last and first locations of consecutive sections. For example, the boundary 240a separates a last location of section$_0$, that is, the location$_{31}$, from a first location of section$_1$, that is, the location$_{32}$. The boundary 240b separates a last location of section$_1$, that is, the location$_{63}$, from a first location of section$_2$, that is, the location$_{64}$. The boundary 240c separates a last location of section$_2$, that is, the location$_{95}$, from a first location of section$_3$, that is, the location$_{96}$. The boundary 240d separates a last location of sections, that is, the location$_{127}$, from a first location of section$_1$, that is, the location$_0$.

As the mapper 102 maps the instructions 104, as disclosed above with regard to FIG. 1B, the mapper adds entries to locations of the journal 230 in a forward direction 245 and moves a head pointer 251 in the forward direction 245. The head pointer 251 points to an empty location within the journal 230 that is a next entry to be written and is advanced in the forward direction after such next entry is written. The next entry to be written may be referred to interchangeably herein as a head entry 252. A tail pointer 253 follows the head pointer 251 in the forward direction 245 and is advanced in the forward direction 245 when an entry of the journal 230 is consumed, that is, read from the journal 230. An entry pointed to by the tail pointer 253 is a next entry to be read. The next entry pointed to by the tail pointer 253 may be referred to interchangeably herein as a tail entry 254. A depth of entries of the circular buffer, that is, a depth of filled/valid entries, is based on a difference between the head pointer 251 and tail pointer 253.

As disclosed above, execution of a given instruction may cause a restart event. The issue unit may notify the mapper 102 of the restart event and provide a mapper identifier associated with the given instruction. The mapper 102 may be further configured to use the mapper identifier to locate a given entry 256 in the journal 230 that is associated with the given instruction. For example, in an event the mapper identifier is 0, the mapper 102 may determine that the given entry 256 is located at location 0, whereas, in an event the mapper identifier is 95, the mapper 102 may determine that the given entry 256 is located at location 95, etc. It should be understood that the given entry may be located at any location with the journal 230.

In response to the restart event, the mapper 102 unwinds mapper state change(s) recorded in entries that the follow the given entry 256. The entries in the journal 130 that follow the given entry 256 in the forward direction 245, that is, the entries between the given entry 256 and the head entry 252, are associated with instructions that follow the given instruction in the program order. The mapper 102 may read those entries in reverse order to back out mapper state changes included therein, in a reverse order relative to an order applied during mapping. As disclosed above, such entries store integer mapper state changes made to the present integer mapper state 108 by the mapper 102 in order to map integer ARs used as destinations in the instructions 104, and store FP mapper state changes made to the present FP mapper state 110 by the mapper 102 in order to map FP ARs used as destinations in the instructions 104.

According to an example embodiment, the mapper 102 may copy a given integer and FP snapshot to the integer mapper state 108 and FP mapper state 110, respectively, to expedite the unwinding. For example, in the example embodiment of FIG. 2, the given entry 256 is located within section$_0$ and the head entry 252 is located in sections. As such, the mapper 102 may read the entries between the head entry 252 and the given entry 256 in a backward direction 247 starting at an entry that precedes the head entry 252 in the forward direction 245. For each entry that is read, the mapper 102 may reverse the mapper state changes store therein in the integer mapper state 108 and the FP mapper state 110 to restore the integer mapper state 108 and the FP mapper state 110 to the former integer and FP mapper state, respectively. In the example embodiment, however, where the given entry 256 is located with section$_0$ and the head entry is located in sections, the mapper 102 may expedite such restoration by employing an integer and FP snapshot associated with the boundary 240a.

For example, instead of reversing all the mapper state changes stored in the entries between the head entry 252 and the given entry 256, the mapper 102 may copy the integer and FP snapshot associated with the boundary 240a to the integer mapper state 108 and the FP mapper state 110, respectively. By reverting the integer mapper state 108 and the FP mapper state 110 to their respective states captured when the boundary 240a was crossed during mapping, the mapper 102 may restore the integer mapper state 108 and the FP mapper state 110 to the former integer and FP mapper state, respectively, based on the entry stored at locational, that is, the last entry of the section$_0$, and any entries that may be present between the given entry 256 and the last entry of section$_0$. A number of the entries that may be present between the given entry 256 and the last entry of section$_0$ is less than a number of entries between the head entry 252 of sections and the given entry 256 of section$_0$ and, thus, expedites restoration relative thereto.

To revert the integer mapper state 108 and the FP mapper state 110 to their respective states captured when the boundary 240a was crossed during mapping, the mapper 102 copies a given integer snapshot and given FP snapshot to the integer mapper state and FP mapper state 110, respectively. Access to the FP snapshot circuitry 116 is, however, blocked, intermittently, as a function of at least one FP present indicator. As such, the copy of the FP snapshot to the FP mapper state 110 may be blocked based on the at least one FP present indicator. Such blocking is performed for power savings, as disclosed above, when the FP snapshots stored in the FP snapshot circuitry 116 are identical to the FP mapper state 110.

In the example embodiment, following the copying, the mapper reads, in the backward direction 247, the last entry of section$_0$ and any entries located between the last entry of section$_0$ and the given entry 256, and reverses any mapper state changes stored therein. A number of the entries to read in the backward direction 247 may be based on respective mapper identifiers associate with the last entry and the given entry 256. For example, a delta between the respective identifiers minus one may be the number of entries to read in the backward direction 247. Based on the location of the given entry 256 and the head entry 252, different pairs of the integer and FP snapshots, such as the integer snapshot 131a-m and the FP snapshots 135a-m, disclosed above, may be employed to expedite the restoration and, in some cases, the present integer mapper state 108 and present FP mapper state 110 may be employed, directly, without being reverted to respective integer and FP snapshots, as disclosed below.

The given entry 256 that is associated with the instruction causing the restart event, is located within a given section of the plurality of sections, namely, section$_0$ of the plurality of sections section$_0$-section$_3$ in the example embodiment of FIG. 2. In an event the head entry 252 is not in the given section, that is, section$_0$ in the example embodiment, and, in an event the head entry 252 is in the given section and the depth is greater than a length of the given section, to restore the present integer and FP mapper state to the former integer and FP mapper state, respectively, the mapper 102 may be further configured to copy a given integer snapshot of the integer snapshots 131a-m to the present integer mapper state 108 and to copy a given FP snapshot of the FP snapshots 135a-m to the present FP mapper state 110.

For example, in the example embodiment, the head entry 252 is not located in the given section, that is, section$_0$. As such, the integer and FP snapshots associate with the boundary 240a may be employed. It also happens that the depth is greater than the length 32 of section$_0$, in the example embodiment. However, it may be that the given entry 256 and head entry 252 are in a same section, in which case, the integer and FP snapshots may be employed so long as the depth is greater than a length of the section.

Copying of the given FP snapshot is prevented in an event access to the FP snapshot circuitry 116 is blocked as a function of the at least one FP present indicator 112. The given integer snapshot and given FP snapshot may be associated with a given boundary of the boundaries, as disclosed above. The given boundary separates the given section and a next section of the plurality of sections. The given boundary is crossed as a function of the mapper transitioning from writing to the given section in the circular buffer to writing to the next section in the circular buffer, such as disclosed further above with regard to FIG. 1F.

The mapper 102 may be further configured to use the mapper identifier to select the given integer snapshot from among the integer snapshots 131a-m and to select the given FP snapshot from among the FP snapshots 135a-m. For example, the integer snapshot 131a and FP snapshot 135a may be associated with a range of mapper identifiers and the given integer and FP snapshots may be selected based on the mapper identifier associated with the given entry 256 being in that range.

In an event the given entry 256 is not a last entry of the given section, the mapper 102 may be further configured to read, without affecting the tail pointer 253, from the journal 230 in the backward direction 247, starting with the last entry. The mapper 102 may be further configured to read, in reverse order, each subsequent entry of at least one subsequent entry that was added to the given section, in the forward direction 245, subsequent to adding the given entry 256 to the given section. The reverse order is reverse relative to a fill order used to add the given entry 256 and the at least one subsequent entry. The backward direction 247 is opposite the forward direction 245. The mapper 102 may be further configured to move the head pointer 251 to point to a next entry in the circular buffer. The next entry immediately follows the given entry 256 in the forward direction 245. For example, after reading the last entry at location 31 and entries between the last entry at location 31 and the given entry 256, in the backward direction 247, the mapper 102 may set the head pointer 251 to which entry immediately follows the given entry 256 in the forward direction 245.

In an event the subsequent entry that is read includes at least one integer mapper state change of the integer mapper state changes, the mapper is further configured to unwind, from the present integer mapper state 108, each integer mapper state change of the at least one integer mapper state change. For example, referring back to FIG. 1C, the integer mapper state change may be unwound by changing a present mapping in the integer register mapper table 116, that is between an integer AR and a present integer PR, to a former mapping, that is between the integer AR and a former integer PR, and returning the present integer PR to the integer PR free list 120. The integer AR and former integer PR are included in the subsequent entry that is read.

In an event the subsequent entry that is read includes at least one FP mapper state change of the FP mapper state changes, the mapper is further configured to unwind, from the present FP mapper state 110, each FP mapper state change of the at least one FP mapper state change. For example, referring back to FIG. 1D, the FP mapper state change may be unwound by changing a present mapping in the FP register mapper table 122, that is between an FP AR and a present FP PR, to a former mapping, that is between the FP AR and a former FP PR, and returning the present FP PR to the FP PR free list 124. The FP AR and former FP PR are included in the subsequent entry that is read.

Continuing to refer to FIG. 2, in an event the head entry 252 is in the given section, that is, section$_0$ in the example embodiment, and the depth is not greater than the length of the given section, to restore the present integer and FP mapper state to the former integer and FP mapper state, respectively, the mapper is further configured to read, without affecting the tail pointer, from the circular buffer in a backward direction, starting with a preceding entry. The preceding entry precedes the head entry 252 in the given section. The mapper reads, in reverse order, each subsequent entry of at least one subsequent entry located in the given section between the head entry 252 and the given entry 256. The reverse order is reverse relative to a fill order used to add, in the forward direction 245, the given entry 256 and each subsequent entry of the at least one subsequent entry to the given section. The mapper 102 is further configured to move the head pointer 251 to point to a next entry in the journal 230. The next entry immediately follows the given entry 256 in the forward direction 245.

In an event the subsequent entry that is read includes at least one integer mapper state change of the integer mapper state changes, the mapper is further configured to unwind, from the present integer mapper state, each integer mapper state change of the at least one integer mapper state change. Referring back to FIG. 1C, the integer mapper state change may be unwound by changing a present mapping in the integer register mapper table 116, that is between an integer AR and a present integer PR, to a former mapping, that is between the integer AR and a former integer PR, and returning the present integer PR to the integer PR free list 120. The integer AR and former integer PR are included in the subsequent entry that is read.

In an event the subsequent entry that is read includes at least one FP mapper state change of the FP mapper state changes, the mapper 102 is further configured to unwind, from the present FP mapper state 110, each FP mapper state change of the at least one FP mapper state change. Referring back to FIG. 1D, the FP mapper state change may be unwound by changing a present mapping in the FP register mapper table 122, that is between an FP AR and a present FP PR, to a former mapping, that is between the FP AR and a former FP PR, and returning the present FP PR to the FP PR free list 124. The FP AR and former FP PR are included in the subsequent entry that is read.

Figure 3:
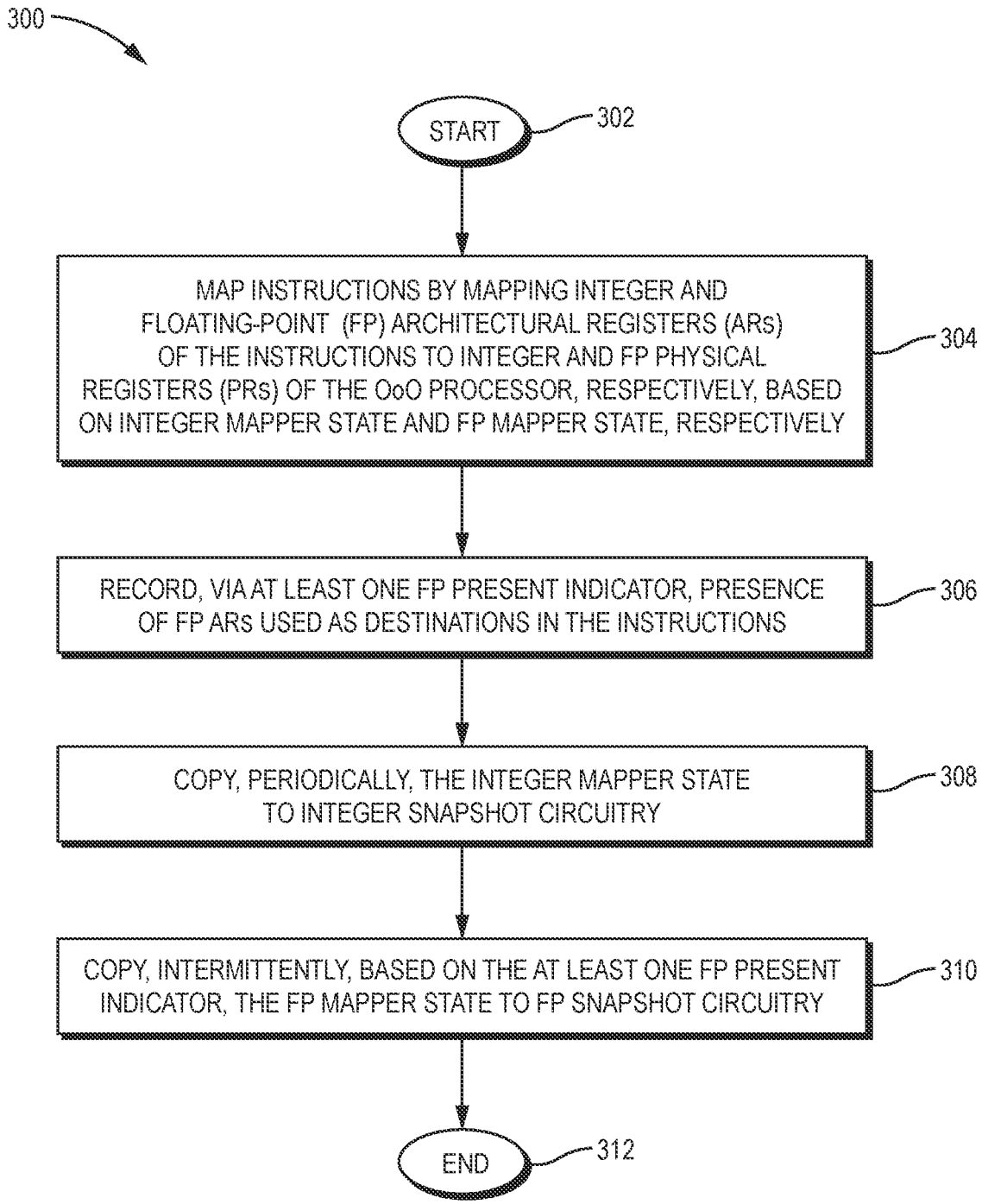
FIG. 3 is a flow diagram of an example embodiment of a method for instruction mapping in an OoO processor.

FIG. 3 is a flow diagram of a method for instruction mapping in an out-of-order (OoO) processor (300). The method begins (302) and maps instructions by mapping integer and floating-point (FP) architectural registers (ARs) of the instructions to integer and FP physical registers (PRs) of the OoO processor, respectively, based on integer mapper state and FP mapper state, respectively (304). The method records, via at least one FP present indicator, presence of FP ARs used as destinations in the instructions (306). The method copies, periodically, the integer mapper state to integer snapshot circuitry (308). The method copies, intermittently, based on the at least one FP present indicator, the FP mapper state to FP snapshot circuitry (310), and the method thereafter ends (312), in the example embodiment.

The method may further comprise writing a respective entry to a journal for each instruction, the journal partitioned into a plurality of sections with respective boundaries therebetween. The method may further comprise copying the integer mapper state to the integer snapshot circuitry, periodically, responsive to a change in sections of the journal written and copying the FP mapper state to the FP snapshot circuitry, intermittently, based on the at least one FP present indicator and the change in sections.

The journal may be a circular buffer with a head pointer and a tail pointer and the method may further comprise detecting the change in sections based on a modification made to the head pointer.

The integer mapper state may represent an integer-register mapper table in its present state and an integer-PR free list in its present state and copying the integer mapper state to the integer snapshot circuitry may include copying, in response to the change, the integer-register mapper table to a given integer-register-map snapshot of a plurality of integer-register-map snapshots included in the integer snapshot circuitry. The copying may further include copying the integer-PR free list to a given integer-PR-free-list snapshot of a plurality of integer-PR-free-list snapshots included in the integer snapshot circuitry. The given integer-register-map snapshot and the given integer-PR-free-list snapshot may be associated with a given boundary of the respective boundaries, the given boundary crossed based on the change.

The given integer-register-map snapshot may include a first respective arrangement of circuitry. The given integer-PR-free-list snapshot may include a second respective arrangement of circuitry. Copying the integer mapper state to the integer snapshot circuitry may further include storing a respective copy of the integer-register mapper table in the first respective arrangement of circuitry and storing a respective copy of the integer-PR free list in the second respective arrangement of circuitry.

The FP mapper state may represent an FP-register mapper table in its present state and an FP physical register (PR) free list in its present state. In an event copying of the FP mapper state to the FP snapshot circuit is enabled based on the at least one FP present indicator, the method may further comprise copying, in response to the change, the FP-register mapper table to a given FP-register-map snapshot of a plurality of FP-register-map snapshots included in the FP snapshot circuitry, and copying, in response to the change, the FP-PR free list to a given FP-PR-free-list snapshot of a plurality of FP-PR-free-list snapshots included in the FP snapshot circuitry. The given FP-register-map snapshot and the given FP-PR-free-list snapshot may be associated with a given boundary of the respective boundaries, the given boundary crossed based on the change.

The given FP-register-map snapshot may include a first respective arrangement of circuitry. The given FP-PR-free-list snapshot may include a second respective arrangement of circuitry. The method may further comprise storing a respective copy of the FP-register mapper table in the first respective arrangement of circuitry and storing a respective copy of the FP-PR free list in the second respective arrangement of circuitry.

The at least one FP present indicator may include a plurality of FP present indicators, each FP present indicator of the plurality of FP present indicators associated, on a one-to-one basis, with a respective section of the plurality of sections of the journal.

The method may further comprise initializing each FP present indicator of the plurality of FP present indicators to be set.

The change may be from a first section of the journal to a second section of the journal and the method may further comprise reading each FP present indicator of the plurality of FP present indicators in response to the change. The method may further comprise, in an event each FP present indicator of the plurality of FP present indicators is clear, disabling copying of the FP mapper state to the FP snapshot circuitry. The method may further comprise, in an event at least a single FP present indicator of the plurality of FP present indicators is set, copying, in response to the change, the FP mapper state to the FP snapshot circuitry and clearing a given FP present indicator of the plurality of FP present indicators. The given FP present indicator may be associated with the second section.

The at least one FP present indicator may be a counter and the method may further comprise, in an event the counter is zero, disabling copying of the FP mapper state to the FP snapshot circuitry and, in an event the counter is non-zero, copying, in response to the change, the FP mapper state to the FP snapshot circuitry.

The integer mapper state may represent an integer-register mapper table in its present state and an integer physical register (PR) free list in its present state. The FP mapper state may represent an FP-register mapper table in its present state and an FP-PR free list in its present state.

The integer-register mapper table may be a lookup table (LUT) including a plurality of entries. The method may further comprise indexing each entry of the plurality of entries of the LUT via a unique integer architectural register (AR) of a plurality of integer ARs of the OoO processor, each entry referencing a unique integer PR of the integer PRs of the OoO processor. The integer ARs of the instructions may be from among the plurality of integer ARs of the OoO processor.

The FP-register mapper table may be a LUT including a plurality of entries. The method may further comprise indexing each entry of the plurality of entries of the LUT via a unique FP AR of a plurality of FP ARs of the OoO processor, each entry referencing a unique FP PR of the FP PRs of the OoO processor. The FP ARs of the instructions may be from among the plurality of FP ARs of the OoO processor.

The method may further comprise identifying free integer PRs via the integer-PR free list and identifying free FP PRs via the FP-PR free list. The free integer PRs may be unmapped integer PRs and the free FP PRs may be unmapped FP PRs.

Mapping the instructions may include, for each instruction, determining whether the instruction includes at least one instance of an integer AR used as a source and, in an event the instruction includes the at least one instance, using the integer mapper register table to map a respective integer AR of each instance of the at least one instance to a respective integer PR of the OoO processor.

Mapping the instructions may include, for each instruction, determining whether the instruction includes at least one instance of an FP AR used as a source, and in an event the instruction includes the at least one instance, using the FP mapper register table to map a respective FP AR of each instance of the at least one instance to a respective FP PR of the OoO processor.

Mapping the instructions may include, for each instruction, writing an entry to a journal for the instruction. Content of the entry may represent an effect or lack thereof on the integer or FP mapper state that resulted from mapping of the instruction.

Mapping the instructions may further include mapping a given number of instructions on a cycle-by-cycle basis and writing at least one entry, of the given number, to the journal on the cycle-by-cycle basis.

In an event an actual number of instructions received in a cycle is less than the given number, mapping the instructions may further include writing the at least one entry, of the given number, to the journal and, in at least one respective entry of the at least one entry written, indicating via the content that the effect is no effect. A total number of the at least one respective entry is a difference between the given number and the actual number.

In an event the instruction has no instance of either an integer or FP AR used as a destination, the effect is no effect and mapping the instruction may further include indicating, via the content of the entry, that no change to either the integer or FP mapper state resulted from mapping the instruction.

In an event the instruction includes at least one instance of an integer AR used as a destination, the effect may include at least one change to the integer mapper state and mapping the instruction may further include including, in the content, for each instance of the at least one instance, the integer AR, a present integer PR, and a next integer. The integer-register mapper table, in its present state, includes a mapping between the integer AR and the present integer PR. Prior to mapping of the instruction, the next integer PR is a free integer PR. Mapping the instruction may further include removing the free integer PR from the integer-PR free list and changing the mapping to be between the integer AR and the next integer PR, causing the mapper to map the integer AR of the instruction to the next integer PR.

In event the mapper is notified of completion of the instruction by the OoO processor, the method may further comprise retiring the entry from the journal and adding, based on the content, the present integer PR of each instance of the at least one instance to the integer-PR free list.

In an event the instruction includes at least one instance of an FP AR used as a destination, the effect includes at least one change to the FP mapper state, and mapping the instruction may further include updating the at least one FP indicator and including in the content, for each at least one instance, the FP AR, a present FP PR, and a next FP PR. The FP-register mapper table, in its present state, includes a mapping between the FP AR and the present FP PR. Prior to mapping of the instruction, the next FP PR is a free FP PR. Mapping the instruction may further include removing the free FP PR from the FP-PR free list and changing the mapping to be between the FP AR and the next FP PR, causing the mapper to map the FP AR of the instruction to the next FP PR.

In an event the mapper is notified of completion of the instruction by the OoO processor, the method may further comprise retiring the entry from the journal and adding, based on the content, the present FP PR of each instance of the at least one instance to the FP-PR free list.

The journal may be partitioned into a plurality of sections. The entry is located within a given section of the plurality of sections. The at least one FP present indicator may include a plurality of FP present indicators. Each FP present indicator of the plurality of FP present indicators may be associated with a respective section of the plurality of sections on a one-to-one basis. In an event the instruction includes at least one instance of an FP AR used as a destination, mapping the instruction may further include setting a given FP present indicator of the plurality of FP present indicators. The given FP present indicator may be associated with the given section.

The at least one FP present indicator may be a counter. The journal may be a circular buffer configured to store at most maximum number of entries. The method may further comprise setting the counter to twice the maximum number of entries in an event the instruction includes at least one instance of an FP AR used as a destination. The method may further comprise setting the counter to twice the maximum number of entries in an event the counter is non-zero and a request for instruction unwinding is received. The method may further comprise decrementing the counter in an event the instruction does not include the at least one instance. The method may further comprise disabling copying of the FP mapper state to the FP snapshot circuitry, in an event the counter is zero, and enabling copying of the FP mapper state to the FP snapshot circuitry, in an event the counter is non-zero.

Figure 4:
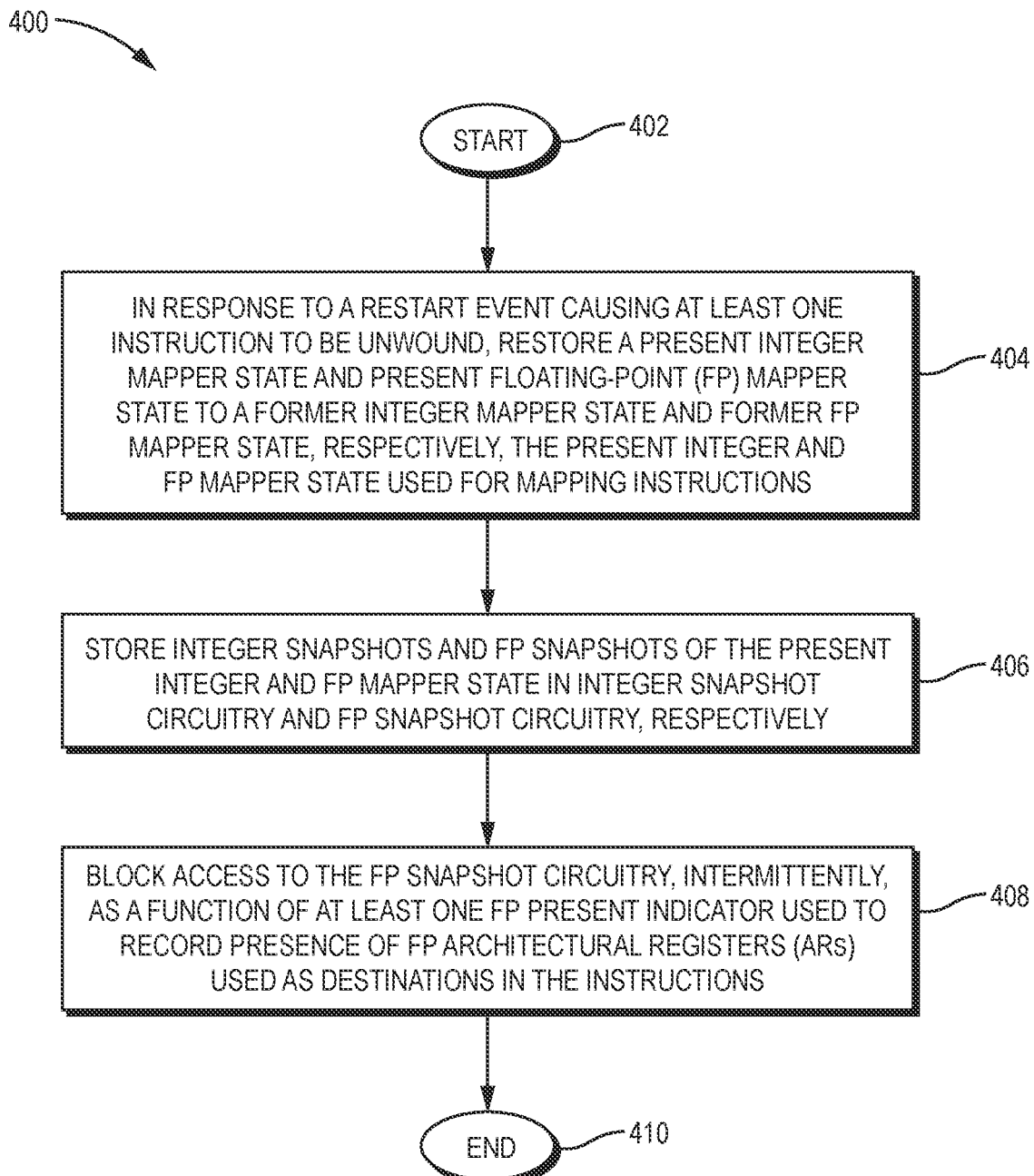
FIG. 4 is a flow diagram of an example embodiment of a method for unwinding instructions in an OoO processor.

FIG. 4 is a flow diagram 400 of an example embodiment of a method for unwinding instructions in an out-of-order (OoO) processor. The method begins (402) and, in response to a restart event causing at least one instruction to be unwound, restores a present integer mapper state and present floating-point (FP) mapper state to a former integer mapper state and former FP mapper state, respectively, wherein the present integer and FP mapper state are used for mapping instructions (404). The method stores integer snapshots and FP snapshots of the present integer and FP mapper state in integer snapshot circuitry and FP snapshot circuitry, respectively, to expedite the restoring (406). The method blocks access to the FP snapshot circuitry, intermittently, as a function of at least one FP present indicator used to record presence of FP architectural registers (ARs) used as destinations in the instructions (408), and the method thereafter ends (410) in the example embodiment.

The present integer mapper state represents an integer register mapper table in its present state and an integer PR free list in its present state. Each integer snapshot of the integer snapshots includes respective copies of the integer register mapper table and integer PR free list stored at a respective point in time. The restoring may include selecting a given integer snapshot of the integer snapshots, copying a given integer-register-map snapshot and given integer-PR-free-list snapshot of the given integer snapshot to the integer register mapper table and integer PR free list, respectively, and modifying the integer register mapper table and integer PR free list based on a journal.

The present FP mapper state represents an FP register mapper table in its present state and an FP PR free list in its present state. Each FP snapshot of the FP snapshots includes respective copies of the FP register mapper table and FP PR free list stored at a respective point in time. The restoring may include selecting a given FP snapshot of the FP snapshots, copying, in an event the access is not blocked, a given FP-register-map snapshot and given FP-PR-free-list snapshot of the given FP snapshot to the FP register mapper table and FP PR free list, respectively, and modifying the FP register mapper table and FP PR free list based on the journal.

The method may further comprise, in response to the restart event, using a mapper identifier to locate a given entry in a journal. The mapper identifier is received with a notification of the restart event. The mapper identifier and given entry are associated with a given instruction associated with the restart event.

Blocking access to the FP snapshot circuitry, intermittently, may include blocking access to the FP snapshot circuitry in an event each FP present indicator of the plurality of FP present indicators is clear and enabling access to the FP snapshot circuitry in an event at least a single FP present indicator of the plurality of FP present indicators is set.

The journal may be a circular buffer configured to store at most a maximum number of entries, the at least one FP present indicator may be a counter, and the method may further comprise setting the counter to twice the maximum number of entries each time a received instruction that uses at least one FP architectural register (AR) as a destination is mapped. The method may further comprise decrementing the counter each time a received instruction that does not use at least one FP AR as a destination is mapped. The method may further comprise, in response to the restart event, setting the counter to twice the maximum number of entries in an event the counter is non-zero. The method may further comprise blocking access to the FP snapshot circuitry in an event the counter is zero and enabling access to the FP snapshot circuitry in an event the counter is non-zero.

Mapping the instructions may include storing, in the journal, integer mapper state changes and FP mapper state changes made to the present integer mapper state and present FP mapper state, respectively. The integer mapper state changes are caused by mapping integer ARs used as destinations in the instructions to integer physical registers (PRs) of the OoO processor. The FP mapper state changes are caused by mapping the FP ARs used as destinations in the instructions to FP PRs of the OoO processor.

The journal may be a circular buffer with a head pointer configured to point to a head entry and a tail pointer configured to point to a tail entry. A depth of entries of the circular buffer is based on a difference between the head and tail pointers and the given entry is located within a given section of the plurality of sections. In an event the head entry is not in the given section, and in an event the head entry is in the given section and the depth is greater than a length of the given section, the restoring may include copying a given integer snapshot of the integer snapshots to the present integer mapper state and copying a given FP snapshot of the FP snapshots to the present FP mapper state, wherein copying of the given FP snapshot is prevented in an event access to the FP snapshot circuitry is blocked as a function of the at least one FP present indicator.

Restoring may include using the mapper identifier to select the given integer snapshot from among the integer snapshots and to select the given FP snapshot from among the FP snapshots.

In an event the given entry is not a last entry of the given section, the restoring may include reading, without affecting the tail pointer, from the circular buffer in a backward direction, starting with the last entry. The reading may include reading, in reverse order, each subsequent entry of at least one subsequent entry that was added to the given section, in a forward direction, subsequent to adding the given entry to the given section. The reverse order is reverse relative to a fill order used to add the given entry and the at least one subsequent entry. The backward direction is opposite the forward direction. The restoring may further include moving the head pointer to point to a next entry in the circular buffer, the next entry immediately following the given entry in the forward direction.

In an event the subsequent entry that is read includes at least one integer mapper state change of the integer mapper state changes, the restoring includes unwinding, from the present integer mapper state, each integer mapper state change of the at least one integer mapper state change.

In an event the subsequent entry that was read includes at least one FP mapper state change of the FP mapper state changes, the restoring includes unwinding, from the present FP mapper state, each FP mapper state change of the at least one FP mapper state change.

In an event the head entry is in the given section and the depth is not greater than the length of the given section, the restoring includes reading, without affecting the tail pointer, from the circular buffer in a backward direction, starting with a preceding entry. The preceding entry precedes the head entry. The reading includes reading, in reverse order, each subsequent entry of at least one subsequent entry located in the given section between the head entry and the given entry. The reverse order is reverse relative to a fill order used to add, in forward direction, the given entry and each subsequent entry of the at least one subsequent entry to the given section. The backward direction is opposite the forward direction. The restoring may further include moving the head pointer to point to a next entry in the circular buffer, the next entry immediately following the given entry in the forward direction.

In an event the subsequent entry that is read includes at least one integer mapper state change of the integer mapper state changes, the restoring includes unwinding, from the present integer mapper state, each integer mapper state change of the integer mapper state changes. The restoring may include unwinding, from the present integer mapper state, each integer mapper state change of the at least one integer mapper state change by changing a present mapping in the integer register mapper table, that is between an integer AR and a present integer PR, to a former mapping, that is between the integer AR and a former integer PR. The restoring may further include returning the present integer PR to the integer PR free list, wherein the integer AR and former integer PR are included in the subsequent entry read.

In an event the subsequent entry that is read includes at least one FP mapper state change of the FP mapper state changes, the restoring includes unwinding, from the present FP mapper state, each FP mapper state change of the FP mapper state changes. The restoring may include unwinding, from the present FP mapper state, each FP mapper state change of the at least one FP mapper state change by changing a present mapping in the FP register mapper table, that is between an FP AR and a present FP PR, to a former mapping, that is between the FP AR and a former FP PR. The restoring may further include returning the present FP PR to the FP PR free list, wherein the FP AR and former FP PR are included in the subsequent entry read.

Figure 5:
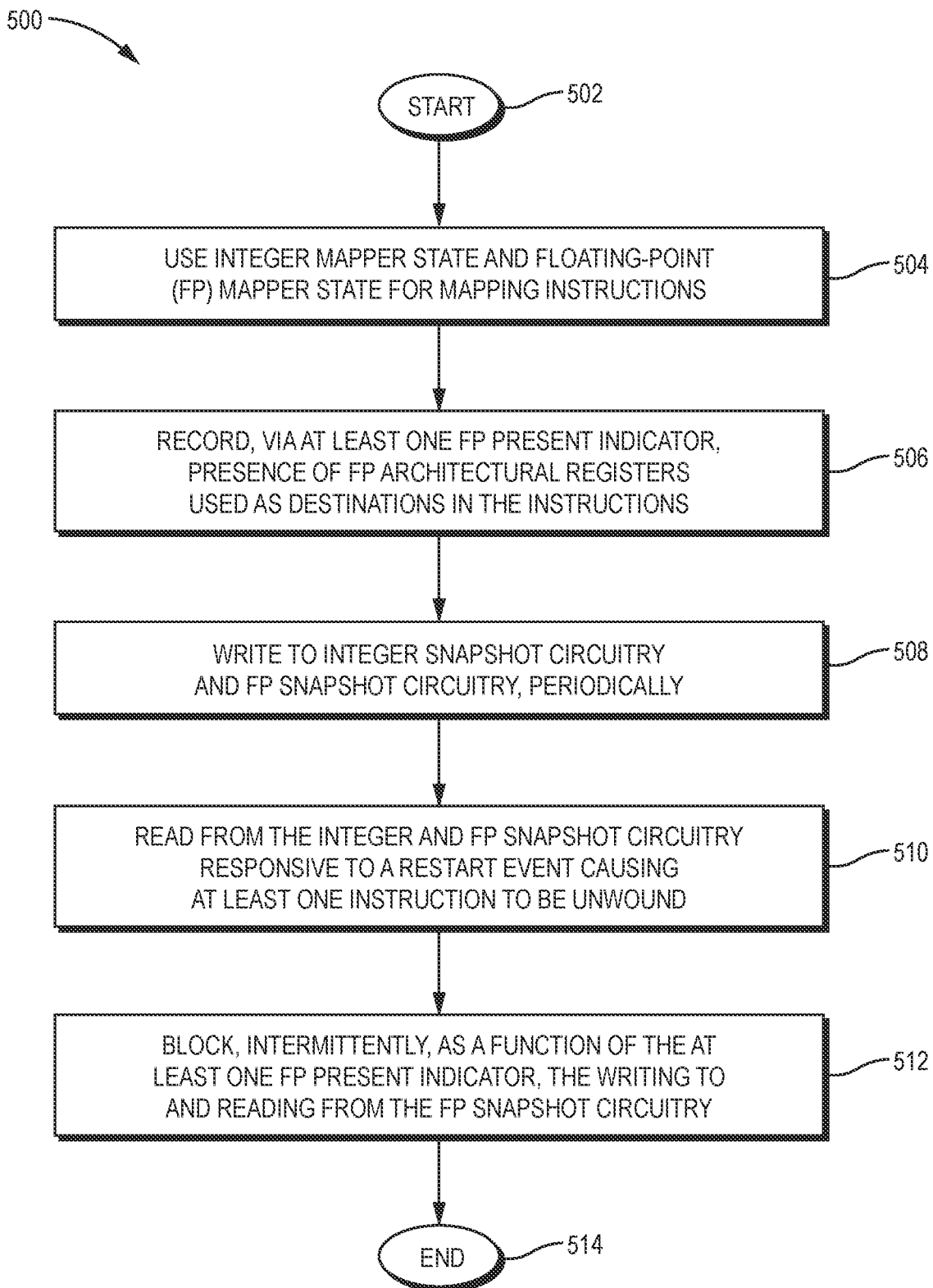
FIG. 5 is a flow diagram of a method for mapping and unwinding instructions in an OoO processor.

FIG. 5 is a flow diagram 500 of a method for mapping and unwinding instructions in an out-of-order (OoO) processor. The method begins (502) and uses integer mapper state and floating-point (FP) mapper state for mapping instructions (504). The method records, via at least one FP present indicator, presence of FP architectural registers used as destinations in the instructions (506). The method writes to integer snapshot circuitry and FP snapshot circuitry, periodically (508). The method reads from the integer and FP snapshot circuitry responsive to a restart event causing at least one instruction to be unwound (510). The method blocks, intermittently, as a function of the at least one FP present indicator, the writing to and reading from the FP snapshot circuitry (512) and the method thereafter ends (514), in the example embodiment.

Writing to the integer snapshot circuitry may include copying the integer mapper state to a given integer snapshot of the integer snapshots and writing to the FP snapshot circuitry may include copying the FP mapper state to a given FP snapshot of the FP snapshots.

Reading from the integer snapshot circuitry may include copying a given integer snapshot of the integer snapshots to the integer mapper state and reading from the FP snapshot circuitry may include copying a given FP snapshot of the FP snapshots to the FP mapper state.

Figure 6:
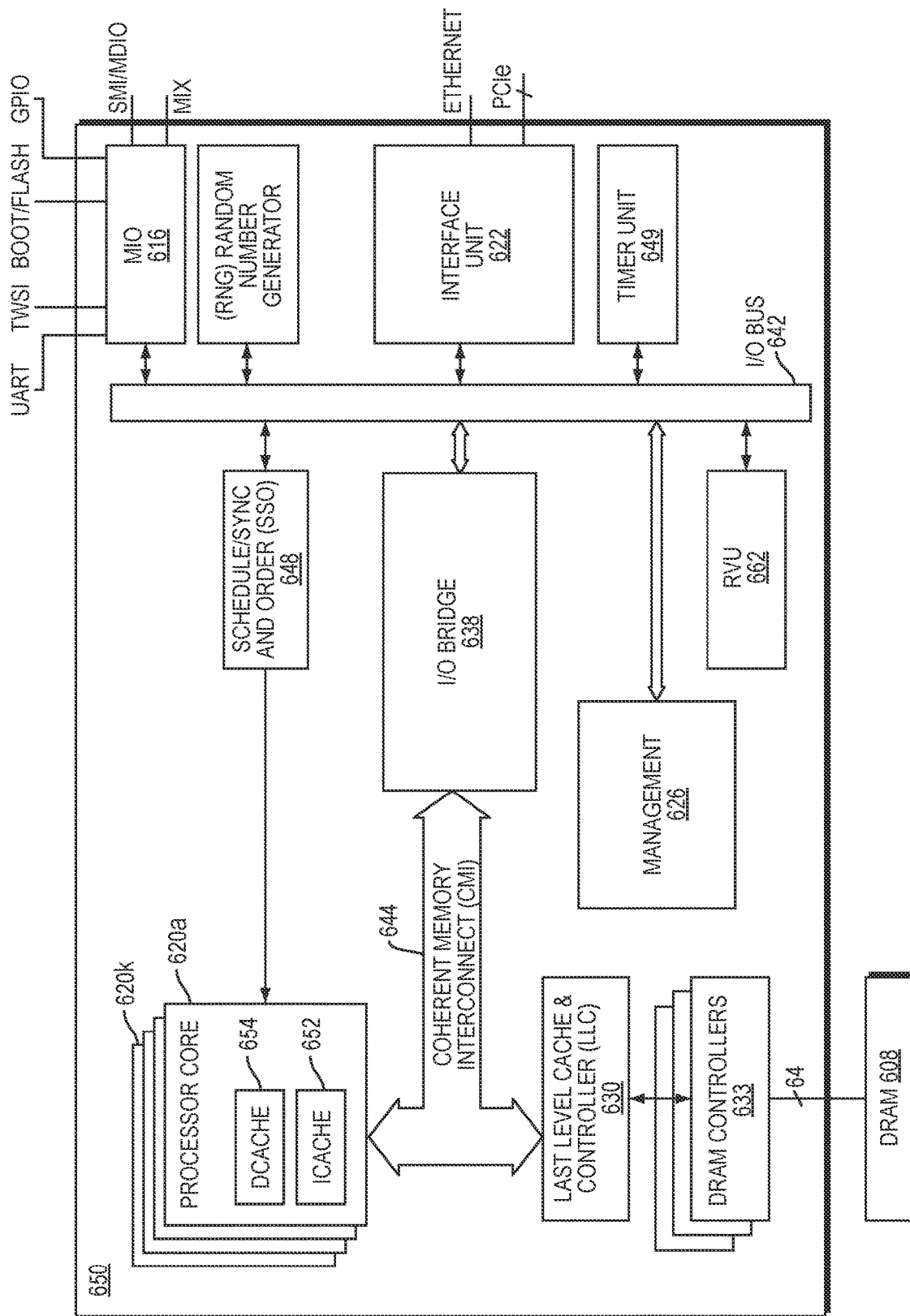
FIG. 6 is a block diagram of an example embodiment of a network services processor in which an example embodiment may be implemented.

FIG. 6 is a block diagram of an example embodiment of a network services processor 650 in which an example embodiment disclosed herein may be implemented. The network services processor 650 may process Open System Interconnection network L2-L7 layer protocols encapsulated in received packets. As is well-known to those skilled in the art, the Open System Interconnection (OSI) reference model defines seven network protocol layers (L1-L7). The physical layer (L1) represents the actual interface, electrical and physical that connects a device to a transmission medium. The data link layer (L2) performs data framing. The network layer (L3) formats the data into packets. The transport layer (L4) handles end to end transport. The session layer (L5) manages communications between devices, for example, whether communication is half-duplex or full-duplex. The presentation layer (L6) manages data formatting and presentation, for example, syntax, control codes, special graphics and character sets. The application layer (L7) permits communication between users, for example, file transfer and electronic mail.

The network services processor 650 may schedule and queue work (packet processing operations) for upper level network protocols, for example L4-L7, and allow processing of upper level network protocols in received packets to be performed to forward packets at wire-speed. Wire-speed is the rate of data transfer of the network over which data is transmitted and received. By processing the protocols to forward the packets at wire-speed, the network services processor 650 does not slow down the network data transfer rate.

A packet is received for processing by an interface unit 622. The interface unit 622 performs pre-processing of the received packet by checking various fields in the network protocol headers (e.g., L2, L3 and L4 headers) included in the received packet, and may perform checksum checks for TCP/User Datagram Protocol (UDP) (L3 network protocols). The interface unit 622 may receive packets via multiple network interface protocols, such as Ethernet and Peripheral Component Interconnect Express (PCIe). In a further embodiment, the interface unit 622 may be configured to receive packets from a plurality of X Attachment Unit Interfaces (XAUIs), Reduced X Attachment Unit Interfaces (RXAUIs), Serial Gigabit Media Independent Interfaces (SGMIIs), 40 GBASE-R, 50 GBASE-R, and/or 100 GBASE-R. The interface unit 622 may also prepare and transmit outgoing packets via one or more of the aforementioned interfaces.

The interface unit 622 may write packet data into buffers in the last level cache and controller (LLC) 630 or external DRAM 608. The packet data may be written into the buffers in a format convenient to higher-layer software executed in at least one processor core of the processor cores 620a-k. Thus, further processing of higher level network protocols is facilitated.

The network services processor 650 can also include one or more application specific co-processors. These co-processors, when included, offload some of the processing from the processor cores 620a-k, thereby enabling the network services processor 650 to achieve high-throughput packet processing.

An I/O bridge 638 is configured to manage the overall protocol and arbitration and provide coherent I/O portioning with an I/O Bus 642. The I/O bridge 638 may include buffer queues for storing information to be transferred between a coherent memory interconnect (CMI) 644, the I/O Bus 642, and the interface unit 622. The I/O bridge 638 may comprise a plurality of individual bridges on which communications and arbitration can be distributed.

The miscellaneous I/O interface (MIO) 616 can include auxiliary interfaces such as General Purpose I/O (GPIO), Flash, IEEE 802 two-wire Management Data I/O Interface (MDIO), Serial Management Interface (SMI), Universal Asynchronous Receiver-Transmitters (UARTs), two-wire serial interface (TWSI), and other serial interfaces.

A Schedule/Sync and Order (SSO) module 648 queues and schedules work for the processor cores 620a-k. Work is queued by adding a work queue entry to a queue. For example, a work queue entry is added by the interface unit 622 for each packet arrival. A timer unit 649 is used to schedule work for the processor cores 620a-k.

The processor cores 620a-k request work from the SSO module 648. The SSO module 648 selects (i.e., schedules) work for one of the processor cores 620a-k and returns a pointer to the work queue entry describing the work to a given processor core of the processor cores 620a-k.

Each processor core includes an instruction cache 652 and Level-1 data cache 154. In one embodiment, the network services processor 650 includes 24 processor cores 620a-k. In some embodiments, each of the processor cores 620a-k may be an implementation of the Arm® architecture, such as the Armv8.2 64-bit architecture, and may be compatible with the Armv8.2 software ecosystem and include hardware floating point, single instruction multiple data (SIMD), and memory management unit (MMU) support. In such an embodiment, consistent with the Armv8.2 architecture, the processor cores 620a-k may contain full hardware support for virtualization. Guest operating systems can thus run at Arm defined user and operating system privilege levels, and hypervisor software can run in a separate higher privilege level. The processor cores 620a-k may also support a secure state in which software may run in three different privilege levels while hardware provides isolation from the non-secure state. It should be understood that a total number of the processor cores 620a-k is not limited to 24 and that an architecture of the processor cores 620a-k is not limited to a 64-bit architecture or to the Armv8.2 64-bit architecture.

Last level cache and controller (LLC) 630 and external DRAM 608 are shared by all of the processor cores 620a-k and I/O co-processor devices (not shown). Each processor core is coupled to the LLC 630 by the CMI 644. The CMI 644 is a communication channel for all memory and I/O transactions between the processor cores 620a-k, the I/O bridge 638 and the LLC 630. In one embodiment, the CMI 644 is scalable to multiple (e.g., 24) processor cores 620a-k, supporting fully-coherent Level-1 data caches 654 with write through. The CMI 644 may be highly-buffered with the ability to prioritize I/O.

The controller of the LLC 630 maintains memory reference coherence. It returns the latest copy of a block for every fill request, whether the block is stored in LLC 630, in external DRAM 608, or is "in-flight." A plurality of DRAM controllers 633 supports the external DRAM 608, and can support preferred protocols, such as the DDR4 protocol.

After a packet has been processed by the processor cores 620a-k, the interface unit 622 reads the packet data from the LLC 630, DRAM 608, performs L4 network protocol post-processing (e.g., generates a TCP/UDP checksum), forwards the packet through the interface unit 622 and frees the LLC 630/DRAM 608 used by the packet. The DRAM Controllers 633 manage in-flight transactions (loads/stores) to/from the DRAM 608.

A resource virtualization unit (RVU) 662 may enable software to map various local function (LF) resources in various modules into several physical functions (PFs) and virtual functions (VFs). This enables multi-unit software drivers compatible with Linux®, Windows® and the data plane development kit (DPDK).

A management module 626 may include various units for managing operation of the network services processor 650. For example, the management module 626 may include a temperature sensor, a power serial bus master interface to determine current performance and energy consumption, and a memory diagnostic controller to detect and report memory errors. The management module 26 may further include control processors, such as a system control processor for power management and other secure chip management tasks, and a module control processor for module management and other non-secure chip management tasks.

While example embodiments have been particularly shown and described, it will be understood by those skilled in the art that various changes in form and details may be made therein without departing from the scope of the embodiments encompassed by the appended claims.

What is claimed is:

1. A system comprising:
    integer snapshot circuitry;
    floating point (FP) snapshot circuitry; and
    a mapper configured to copy, periodically, integer mapper state of the mapper to the integer snapshot circuitry and to copy intermittently, based on at least one FP present indicator, FP mapper state of the mapper to the FP snapshot circuitry, the at least one FP present indicator used by the mapper to record presence of FP architectural registers (ARs) used as destinations in instructions mapped by the mapper.

2. The system of claim 1, wherein the mapper is further configured to map the instructions by mapping integer ARs and the FP ARs of the instructions to integer physical registers (PRs) and FP PRs of an out-of-order (OoO) processor, respectively, based on the integer mapper state and the FP mapper state of the mapper, respectively.

3. The system of claim 1, further comprising a journal partitioned into a plurality of sections with respective boundaries therebetween and wherein the mapper is further configured to:
    write a respective entry to the journal for each instruction;
    copy the integer mapper state to the integer snapshot circuitry, periodically, responsive to a change in sections of the journal written to by the mapper; and
    copy the FP mapper state to the FP snapshot circuitry intermittently, based on the at least one FP present indicator and the change in sections, wherein the journal is a circular buffer with a head pointer and a tail pointer and wherein the mapper is further configured to detect the change in sections based on a modification made to the head pointer.

4. The system of claim 3, further comprising an integer-register mapper table and an integer-physical register (PR) free list and wherein:
    the integer mapper state represents the integer-register mapper table in its present state and the integer-PR free list in its present state;
    to copy the integer mapper state to the integer snapshot circuitry, the mapper is further configured to copy, in response to the change, (i) the integer-register mapper table to a given integer-register-map snapshot of a plurality of integer-register-map snapshots included in the integer snapshot circuitry and (ii) the integer-PR free list to a given integer-PR-free-list snapshot of a plurality of integer-PR-free-list snapshots included in the integer snapshot circuitry, wherein the given integer-register-map snapshot and the given integer-PR-free-list snapshot are associated with a given boundary of the respective boundaries, the given boundary crossed based on the change;
    the given integer-register-map snapshot includes a first respective arrangement of circuitry configured to store a respective copy of the integer-register mapper table; and
    the given integer-PR-free-list snapshot includes a second respective arrangement of circuitry configured to store a respective copy of the integer-PR free list.

5. The system of claim 4, further comprising an FP-register mapper table and an FP-physical register (PR) free list and wherein:
    the FP mapper state represents the FP-register mapper table in its present state and the FP-PR free list in its present state;
    in an event copying of the FP mapper state to the FP snapshot circuit is enabled based on the at least one FP present indicator, the mapper is further configured to copy, in response to the change, (i) the FP-register mapper table to a given FP-register-map snapshot of a plurality of FP-register-map snapshots included in the FP snapshot circuitry and (ii) the FP-PR free list to a given FP-PR-free-list snapshot of a plurality of FP-PR-free-list snapshots included in the FP snapshot circuitry, wherein the given FP-register-map snapshot and the given FP-PR-free-list snapshot are associated with a given boundary of the respective boundaries, the given boundary crossed based on the change;
    the given FP-register-map snapshot includes a first respective arrangement of circuitry configured to store a respective copy of the FP-register mapper table; and
    the given FP-PR-free-list snapshot includes a second respective arrangement of circuitry configured to store a respective copy of the FP-PR free list.

6. The system of claim 3, wherein the at least one FP present indicator includes a plurality of FP present indicators, each FP present indicator of the plurality of FP present indicators associated, on a one-to-one basis, with a respective section of the plurality of sections of the journal.

7. The system of claim 6, wherein the change is from a first section of the journal to a second section of the journal, wherein the mapper is further configured to read each FP present indicator of the plurality of FP present indicators in response to the change, and wherein:

in an event each FP present indicator of the plurality of FP present indicators is clear, the mapper is further configured to disable copying of the FP mapper state to the FP snapshot circuitry; and in an event at least a single FP present indicator of the plurality of FP present indicators is set, the mapper is further configured to copy, in response to the change, the FP mapper state to the FP snapshot circuitry and to clear a given FP present indicator of the plurality of FP present indicators, the given FP present indicator associated with the second section.

8. The system of claim 3, wherein a given FP present indicator of the at least one FP present indicator is a counter and wherein the mapper is further configured to:

in an event the counter is zero, disable copying of the FP mapper state to the FP snapshot circuitry; and in an event the counter is non-zero, copy, in response to the change, the FP mapper state to the FP snapshot circuitry.

9. The system of claim 1, further comprising:

an integer-register mapper table and an integer-physical register (PR) free list, wherein the integer mapper state represents the integer-register mapper table in its present state and the integer-PR free list in its present state; and an FP-register mapper table and an FP-PR free list, wherein the FP mapper state represents the FP-register mapper table in its present state and the FP-PR free list in its present state.

10. The system of claim 9, wherein:

the mapper is further configured to map the instructions by mapping integer ARs and the FP ARs of the instructions to integer physical registers (PRs) and FP PRs of an out-of-order (OoO) processor, respectively, based on the integer mapper state and the FP mapper state of the mapper, respectively;

the integer-register mapper table is a lookup table (LUT) including a plurality of entries;

each entry of the plurality of entries of the LUT is indexed via a unique integer architectural register (AR) of a plurality of integer ARs of the OoO processor and is configured to reference a unique integer PR of the integer PRs of the OoO processor; and the integer ARs of the instructions are from among the plurality of integer ARs of the OoO processor.

11. The system of claim 9, wherein:

the mapper is further configured to map the instructions by mapping integer ARs and the FP ARs of the instructions to integer physical registers (PRs) and FP PRs of an out-of-order (OoO) processor, respectively, based on the integer mapper state and the FP mapper state of the mapper, respectively;

the FP-register mapper table is a LUT including a plurality of entries;

each entry of the plurality of entries of the LUT is indexed via a unique FP AR of a plurality of FP ARs of the OoO processor and is configured to reference a unique FP PR of the FP PRs of the OoO processor; and the FP ARs of the instructions are from among the plurality of FP ARs of the OoO processor.

12. The system of claim 9, wherein:

the mapper is further configured to map the instructions by mapping integer ARs and the FP ARs of the instructions to integer physical registers (PRs) and FP PRs of an out-of-order (OoO) processor, respectively, based on the integer mapper state and the FP mapper state of the mapper, respectively;

the integer-PR free list is configured to identify free integer PRs;

the FP-PR free list is configured to identify free FP PRs;

the free integer PRs are unmapped integer PRs; and the free FP PRs are unmapped FP PRs;

to map the instructions, the mapper is further configured, for each instruction, to:

determine whether the instruction includes at least one instance of an integer AR used as a source;

in an event the instruction includes the at least one instance, use the integer mapper register table to map a respective integer AR of each instance of the at least one instance to a respective integer PR of the OoO processor;

determine whether the instruction includes at least one instance of an FP AR used as a source; and in an event the instruction includes the at least one instance, use the FP mapper register table to map a respective FP AR of each instance of the at least one instance to a respective FP PR of the OoO processor.

13. The system of claim 9, wherein the system further comprises a journal and wherein, to map the instructions, the mapper is further configured, for each instruction, to write an entry to the journal for the instruction, wherein content of the entry represents an effect or lack thereof on the integer or FP mapper state that resulted from mapping of the instruction.

14. The system of claim 13, wherein the mapper is further configured to:

map the instructions by mapping integer ARs and the FP ARs of the instructions to integer physical registers (PRs) and FP PRs of an out-of-order (OoO) processor, respectively, based on the integer mapper state and the FP mapper state of the mapper, respectively;

map a given number of instructions on a cycle-by-cycle basis and to write at least one entry, of the given number, to the journal on the cycle-by-cycle basis, and in an event an actual number of instructions received in a cycle is less than the given number, the mapper is further configured to:

write the at least one entry, of the given number, to the journal; and in at least one respective entry of the at least one entry written, indicate via the content that the effect is no effect, wherein a total number of the at least one respective entry is a difference between the given number and the actual number, wherein:

in an event the instruction has no instance of either an integer or FP AR used as a destination:

the effect is no effect; and the mapper is further configured to indicate, via the content of the entry, that no change to either the integer or FP mapper state resulted from mapping the instruction; and in an event the instruction includes at least one instance of an integer AR used as a destination, the effect includes at least one change to the integer mapper state and the mapper is further configured to include in the content, for each instance of the at least one instance:

the integer AR;
a present integer PR, wherein the integer-register mapper table, in its present state, includes a mapping between the integer AR and the present integer PR; and
a next integer PR, wherein, prior to mapping of the instruction, the next integer PR is a free integer PR, and wherein:
the mapper is further configured to remove the free integer PR from the integer-PR free list and change the mapping to be between the integer AR and the next integer PR, causing the mapper to map the integer AR of the instruction to the next integer PR; and
in an event the mapper is notified of completion of the instruction by the OoO processor, the mapper is further configured to retire the entry from the journal and add, based on the content, the present integer PR of each instance of the at least one instance to the integer-PR free list.

15. The system of claim 13, wherein the mapper is further configured to map the instructions by mapping integer ARs and the FP ARs of the instructions to integer physical registers (PRs) and FP PRs of an out-of-order (OoO) processor, respectively, based on the integer mapper state and the FP mapper state of the mapper, respectively, and wherein, in an event the instruction includes at least one instance of an FP AR used as a destination, the effect includes at least one change to the FP mapper state and the mapper is further configured to update the at least one FP indicator and to include in the content, for each at least one instance:
the FP AR;
a present FP PR, wherein the FP-register mapper table, in its present state, includes a mapping between the FP AR and the present FP PR; and
a next FP PR, wherein, prior to mapping of the instruction, the next FP PR is a free FP PR, wherein the mapper is further configured to remove the free FP PR from the FP-PR free list and change the mapping to be between the FP AR and the next FP PR, causing the mapper to map the FP AR of the instruction to the next FP PR, wherein, in an event the mapper is notified of completion of the instruction by the OoO processor, the mapper is further configured to retire the entry from the journal and add, based on the content, the present FP PR of each instance of the at least one instance to the FP-PR free list.

16. The system of claim 13, wherein:
the journal is partitioned into a plurality of sections;
the entry is located within a given section of the plurality of sections;
the at least one FP present indicator includes a plurality of FP present indicators, each FP present indicator of the plurality of FP present indicators associated with a respective section of the plurality of sections on a one-to-one basis; and
in an event the instruction includes at least one instance of an FP AR used as a destination, the mapper is further configured to set a given FP present indicator of the plurality of FP present indicators, the given FP present indicator associated with the given section.

17. The system of claim 13, wherein a given FP present indicator of the at least one FP present indicator is a counter, wherein the journal is a circular buffer configured to store at most a maximum number of entries, and wherein the mapper is further configured to:

set the counter to twice the maximum number of entries in an event the instruction includes at least one instance of an FP AR used as a destination;
set the counter to twice the maximum number of entries in an event the counter is non-zero and a request for instruction unwinding is received;
decrement the counter in an event the instruction does not include the at least one instance;
disable copying of the FP mapper state to the FP snapshot circuitry, in an event the counter is zero; and
enable copying of the FP mapper state to the FP snapshot circuitry, in an event the counter is non-zero.

18. A method comprising:
mapping instructions by mapping integer and floating-point (FP) architectural registers (ARs) of the instructions to integer and FP physical registers (PRs), respectively, based on integer mapper state and FP mapper state, respectively;
recording, via at least one FP present indicator, presence of FP ARs used as destinations in the instructions;
copying, periodically, the integer mapper state to integer snapshot circuitry; and
copying intermittently, based on the at least one FP present indicator, the FP mapper state to FP snapshot circuitry.

19. The method of claim 18, further comprising:
writing a respective entry to a journal for each instruction, the journal partitioned into a plurality of sections with respective boundaries therebetween;
copying the integer mapper state to the integer snapshot circuitry, periodically, responsive to a change in sections of the journal written; and
copying the FP mapper state to the FP snapshot circuitry intermittently, based on the at least one FP present indicator and the change in sections, wherein the journal is a circular buffer with a head pointer and a tail pointer and wherein the method further comprises detecting the change in sections based on a modification made to the head pointer.

20. The method of claim 19, wherein the integer mapper state represents an integer-register mapper table in its present state and an integer-PR free list in its present state and wherein copying the integer mapper state to the integer snapshot circuitry includes:
copying, in response to the change, the integer-register mapper table to a given integer-register-map snapshot of a plurality of integer-register-map snapshots included in the integer snapshot circuitry; and
copying, in response to the change, the integer-PR free list to a given integer-PR-free-list snapshot of a plurality of integer-PR-free-list snapshots included in the integer snapshot circuitry, wherein the given integer-register-map snapshot and the given integer-PR-free-list snapshot are associated with a given boundary of the respective boundaries, the given boundary crossed based on the change.

21. The method of claim 20, wherein the given integer-register-map snapshot includes a first respective arrangement of circuitry, wherein the given integer-PR-free-list snapshot includes a second respective arrangement of circuitry, and wherein copying the integer mapper state to the integer snapshot circuitry further includes:
storing a respective copy of the integer-register mapper table in the first respective arrangement of circuitry; and
storing a respective copy of the integer-PR free list in the second respective arrangement of circuitry.

22. The method of claim 19, wherein the FP mapper state represents an FP-register mapper table in its present state and an FP-physical register (PR) free list in its present state, and wherein in an event copying of the FP mapper state to the FP snapshot circuit is enabled based on the at least one FP present indicator, the method further comprises:
  copying, in response to the change, the FP-register mapper table to a given FP-register-map snapshot of a plurality of FP-register-map snapshots included in the FP snapshot circuitry;
  copying, in response to the change, the FP-PR free list to a given FP-PR-free-list snapshot of a plurality of FP-PR-free-list snapshots included in the FP snapshot circuitry, wherein the given FP-register-map snapshot and the given FP-PR-free-list snapshot are associated with a given boundary of the respective boundaries, the given boundary crossed based on the change, wherein the given FP-register-map snapshot includes a first respective arrangement of circuitry, wherein the given FP-PR-free-list snapshot includes a second respective arrangement of circuitry; and
  storing a respective copy of the FP-register mapper table in the first respective arrangement of circuitry; and
  storing a respective copy of the FP-PR free list in the second respective arrangement of circuitry.

23. The method of claim 19, wherein:
the at least one FP present indicator includes a plurality of FP present indicators, each FP present indicator of the plurality of FP present indicators associated, on a one-to-one basis, with a respective section of the plurality of sections of the journal;
the change is from a first section of the journal to a second section of the journal; and
the method further comprises:
  reading each FP present indicator of the plurality of FP present indicators in response to the change;
  in an event each FP present indicator of the plurality of FP present indicators is clear, disabling copying of the FP mapper state to the FP snapshot circuitry; and
  in an event at least a single FP present indicator of the plurality of FP present indicators is set, copying, in response to the change, the FP mapper state to the FP snapshot circuitry and clearing a given FP present indicator of the plurality of FP present indicators, the given FP present indicator associated with the second section.

24. The method of claim 19, wherein a given FP present indicator of the at least one FP present indicator is a counter and wherein the method further comprises:
  in an event the counter is zero, disabling copying of the FP mapper state to the FP snapshot circuitry; and
  in an event the counter is non-zero, copying, in response to the change, the FP mapper state to the FP snapshot circuitry.

25. The method of claim 18, wherein the integer mapper state represents an integer-register mapper table in its present state and an integer-physical register (PR) free list in its present state, and wherein the FP mapper state represents an FP-register mapper table in its present state and an FP-PR free list in its present state.

26. The method of claim 25, wherein the integer and FP PRs are of an out-of-order (OoO) processor, wherein the integer-register mapper table is a lookup table (LUT) including a plurality of entries, wherein the method further comprises indexing each entry of the plurality of entries of the LUT via a unique integer architectural register (AR) of a plurality of integer ARs of the OoO processor, each entry referencing a unique integer PR of the integer PRs of the OoO processor, and wherein the integer ARs of the instructions are from among the plurality of integer ARs of the OoO processor.

27. The method of claim 25, wherein the integer and FP PRs are of an out-of-order (OoO) processor, wherein the FP-register mapper table is a LUT including a plurality of entries, wherein the method further comprises indexing each entry of the plurality of entries of the LUT via a unique FP AR of a plurality of FP ARs of the OoO processor, each entry referencing a unique FP PR of the FP PRs of the OoO processor, and wherein the FP ARs of the instructions are from among the plurality of FP ARs of the OoO processor.

28. The method of claim 25, further comprising
  identifying free integer PRs via the integer-PR free list; and
  identifying free FP PRs via the FP-PR free list, wherein the free integer PRs are unmapped integer PRs and wherein the free FP PRs are unmapped FP PRs.

29. The method of claim 25, wherein the integer and FP PRs are of an out-of-order (OoO) processor, wherein mapping the instructions includes, for each instruction:
  determining whether the instruction includes at least one instance of an integer AR used as a source; and
  in an event the instruction includes the at least one instance, using the integer mapper register table to map a respective integer AR of each instance of the at least one instance to a respective integer PR of the OoO processor.

30. The method of claim 25, wherein the integer and FP PRs are of an out-of-order (OoO) processor, wherein mapping the instructions includes, for each instruction:
  determining whether the instruction includes at least one instance of an FP AR used as a source; and
  in an event the instruction includes the at least one instance, using the FP mapper register table to map a respective FP AR of each instance of the at least one instance to a respective FP PR of the OoO processor.

31. The method of claim 25, wherein mapping the instructions includes, for each instruction:
  writing an entry to a journal for the instruction, wherein content of the entry represents an effect or lack thereof on the integer or FP mapper state that resulted from mapping of the instruction.

32. The method of claim 31, wherein mapping the instructions further includes:
  mapping a given number of instructions on a cycle-by-cycle basis; and
  writing at least one entry, of the given number, to the journal on the cycle-by-cycle basis, wherein, in an event an actual number of instructions received in a cycle is less than the given number, mapping the instructions further includes:
    writing the at least one entry, of the given number, to the journal; and
    in at least one respective entry of the at least one entry written, indicating via the content that the effect is no effect, wherein a total number of the at least one respective entry is a difference between the given number and the actual number.

33. The method of claim 32, wherein, in an event the instruction has no instance of either an integer or FP AR used as a destination, the effect is no effect and mapping the instruction further includes indicating, via the content of the entry, that no change to either the integer or FP mapper state resulted from mapping the instruction.

34. The method of claim 33, wherein, in an event the instruction includes at least one instance of an integer AR used as a destination, the effect includes at least one change to the integer mapper state and mapping the instruction further includes including in the content, for each instance of the at least one instance:
   the integer AR;
   a present integer PR, wherein the integer-register mapper table, in its present state, includes a mapping between the integer AR and the present integer PR; and
   a next integer PR, wherein, prior to mapping of the instruction, the next integer PR is a free integer PR, wherein mapping the instruction further includes removing the free integer PR from the integer-PR free list and changing the mapping to be between the integer AR and the next integer PR, causing the mapper to map the integer AR of the instruction to the next integer PR, wherein the integer and FP PRs are of an out-of-order (OoO) processor and wherein, in an event the mapper is notified of completion of the instruction by the OoO processor, the method further comprises retiring the entry from the journal and adding, based on the content, the present integer PR of each instance of the at least one instance to the integer-PR free list.

35. The method of claim 31, wherein, in an event the instruction includes at least one instance of an FP AR used as a destination, the effect includes at least one change to the FP mapper state, and mapping the instruction further includes updating the at least one FP indicator and including in the content, for each at least one instance:
   the FP AR;
   a present FP PR, wherein the FP-register mapper table, in its present state, includes a mapping between the FP AR and the present FP PR; and
   a next FP PR, wherein, prior to mapping of the instruction, the next FP PR is a free FP PR, wherein mapping the instruction further includes removing the free FP PR from the FP-PR free list and changing the mapping to be between the FP AR and the next FP PR, causing the mapper to map the FP AR of the instruction to the next FP PR, wherein the integer and FP PRs are of an out-of-order (OoO) processor and wherein, in an event the mapper is notified of completion of the instruction by the OoO processor, the method further comprises retiring the entry from the journal and adding, based on the content, the present FP PR of each instance of the at least one instance to the FP-PR free list.

36. The method of claim 31, wherein the journal is partitioned into a plurality of sections, wherein the entry is located within a given section of the plurality of sections, wherein the at least one FP present indicator includes a plurality of FP present indicators, each FP present indicator of the plurality of FP present indicators associated with a respective section of the plurality of sections on a one-to-one basis, and wherein, in an event the instruction includes at least one instance of an FP AR used as a destination, mapping the instruction further includes setting a given FP present indicator of the plurality of FP present indicators, the given FP present indicator associated with the given section.

37. The method of claim 31, wherein a given FP present indicator of the at least one FP present indicator is a counter, wherein the journal is a circular buffer configured to store at most a maximum number of entries, and wherein the method further comprises:
   setting the counter to twice the maximum number of entries in an event the instruction includes counter instance of an FP AR used as a destination;
   setting the counter to twice the maximum number of entries in an event the counter is non-zero and a request for instruction unwinding is received;
   decrementing the counter in an event the instruction does not include the at least one instance;
   disabling copying of the FP mapper state to the FP snapshot circuitry, in an event the counter is zero; and
   enabling copying of the FP mapper state to the FP snapshot circuitry, in an event the counter is non-zero.

38. A mapper configured to:
   map instructions by mapping integer and floating-point (FP) architectural registers (ARs) of instructions to integer and FP physical registers (PRs), respectively, based on integer mapper state and FP mapper state of the mapper, respectively;
   record, via at least one FP present indicator, presence of FP ARs used as destinations in the instructions; and
   copy, periodically, the integer mapper state to integer snapshot circuitry and to copy intermittently, based on the at least one FP present indicator, the FP mapper state to FP snapshot circuitry.

39. An apparatus comprising:
   means for mapping instructions by mapping integer and floating-point (FP) architectural registers (ARs) of instructions to integer and FP physical registers (PRs), respectively, based on integer mapper state and FP mapper state of the mapper, respectively;
   means for recording, via at least one FP present indicator, presence of FP ARs used as destinations in the instructions;
   means for copying, periodically, the integer mapper state to integer snapshot circuitry; and
   means for copying intermittently, based on the at least one FP present indicator, the FP mapper state to FP snapshot circuitry.

* * * * *

UNITED STATES PATENT AND TRADEMARK OFFICE
CERTIFICATE OF CORRECTION

PATENT NO. : 11,531,549 B1
APPLICATION NO. : 17/218771
DATED : December 20, 2022
INVENTOR(S) : David A. Carlson It is certified that error appears in the above-identified patent and that said Letters Patent is hereby corrected as shown below:

In the Specification

In Column 1, Line 8, delete "2019." and insert --2019, now U.S. Pat. No. 10,996,957.--

In Column 6, Line 22, delete "ARA" and insert --AR $A$--

In Column 6, Line 64, delete "sate" and insert --state--

In Column 8, Line 24, delete "sate" and insert --state--

In Column 17, Line 61, delete "associate" and insert --associated--

In Column 24, Line 39, delete "that the" and insert --that--

In Column 25, Line 7, delete "sections." and insert --section$_3$.--

In Column 25, Line 23, delete "sections," and insert --section$_3$,--

In Column 25, Line 58, delete "that the" and insert --that--

In Column 26, Line 11, delete "sections." and insert --section$_3$.--

In Column 26, Line 16, delete "store" and insert --stored--

In Column 26, Line 22, delete "sections," and insert --section$_3$,--

In Column 26, Line 35, delete "locational," and insert --location$_{31}$,--

In Column 26, Line 41, delete "sections" and insert --section$_3$--

Signed and Sealed this
Fourth Day of July, 2023

Katherine Kelly Vidal
*Director of the United States Patent and Trademark Office*

In Column 26, Line 62, delete "associate" and insert --associated--

In the Claims

In Column 37, Line 49, in Claim 1, delete "floating point (FP)" and insert --floating-point (FP)--

In Column 43, Line 21, in Claim 22, delete "circuitry; and" and insert --circuitry;--

In Column 44, Line 15, in Claim 28, delete "comprising" and insert --comprising:--